United States Patent
Grace et al.

(10) Patent No.: US 10,824,400 B2
(45) Date of Patent: Nov. 3, 2020

(54) GRAPHICAL REPRESENTATION OF PORTS OF MULTIPLE TYPES

(71) Applicant: The MathWorks, Inc., Natick, MA (US)

(72) Inventors: Andrew C. Grace, Sherborn, MA (US); Michael H. McLernon, Attleboro, MA (US); Murali K. Yeddanapudi, Lexington, MA (US); Ramamurthy Mani, Wayland, MA (US); Pieter J. Mosterman, Framingham, MA (US); Michael I. Clune, Natick, MA (US); Meera S. Atreyam, Westborough, MA (US)

(73) Assignee: The MathWorks, Inc., Natick, MA (US)

( * ) Notice: Subject to any disclaimer, the term of this patent is extended or adjusted under 35 U.S.C. 154(b) by 955 days.

(21) Appl. No.: 14/084,226

(22) Filed: Nov. 19, 2013

(65) Prior Publication Data
US 2014/0200871 A1    Jul. 17, 2014

Related U.S. Application Data

(63) Continuation of application No. 11/022,249, filed on Dec. 21, 2004, now abandoned.

(60) Provisional application No. 60/611,576, filed on Sep. 20, 2004.

(51) Int. Cl.
*G06F 8/34* (2018.01)

(52) U.S. Cl.
CPC .................... *G06F 8/34* (2013.01)

(58) Field of Classification Search
CPC ........................................... G06F 8/34
USPC ........................................ 703/6, 13, 1
See application file for complete search history.

(56) References Cited

U.S. PATENT DOCUMENTS

| | | | | |
|---|---|---|---|---|
| 4,985,860 A | | 1/1991 | Vlach | |
| 5,701,439 A | * | 12/1997 | James | G06F 17/5009 703/17 |
| 5,732,192 A | * | 3/1998 | Malin | G06F 17/5036 703/2 |

OTHER PUBLICATIONS

J. Liu, et al., "A Component-Based Approach to Modeling and Simulating Mixed-Signal and Hybrid Systems," ACM Transactions on Modeling and Computer Simulation (TOMACS), Oct. 1, 2002, vol. 12, No. 4, pp. 343-368.*

M. Remelhe, et al., "An Environment for the Integrated Modelling of Systems With Complex Continuous and Discrete Dynamics," Modelling, Analysis, and Design of Hybrid Systems, Springer Berlin Heidelberg, 2002, pp. 83-105.*

M. Otter, et al., "Hybrid Models of Physical Systems and Discrete Controllers," at-Automatisierungstechnik, vol. 48, 2000, 12 pages.*

(Continued)

*Primary Examiner* — Juan C Ochoa
(74) *Attorney, Agent, or Firm* — Cesari and McKenna, LLP; Michael R. Reinemann

(57) ABSTRACT

A system and method graphically display ports in a discrete event system (DES) environment. A graphical representation of a model having at least one DES component is provided in the DES environment. A first port of the DES component and a second port of the DES component are indicated by symbols. The first port is indicated by a first symbol representing a port type of the DES environment and the second port is indicated by a second symbol representing a port type of a non-DES environment.

34 Claims, 14 Drawing Sheets

(56) References Cited

OTHER PUBLICATIONS

J. Eker, et al., "Taming heterogeneity—the Ptolemy approach," Proceedings of the IEEE, vol. 91, No. 1, Jan. 2003, pp. 127-144.*
A. Deparade, et al., "Integration and synchronization of discrete formalisms and continuous models in Modelica," Proceedings of the 2002 International Conference on Control Applications (IEEE), vol. 2, 2002, pp. 1189-1194.*
J. Liu, et al., "Actor-Oriented Control System Design: A Responsible Framework Perspective" IEEE Transactions on Control Systems Technology, vol. 12, No. 2, Mar. 2004, pp. 250-262.*
John Davis II et al., "Ptolemy II: Heterogeneous Concurrent Modeling and Design in Java", 1999, 297 pages.*
SimMechanics, for use with Simulink User's Guide, version 1, Dec. 2001, 474 pages.*
Michael Schlotter, "Multibody system simulation with simmechanics", 2003, University of Canterbury, pp. 1-23.*
LabVIEW user manual, Apr. 2003 Edition, 349 pages.*
Eker et al., Taming heterogeneity—the Ptolemy approach, 2003, Proceedings IEEE 91, 1, pp. 127-144.*
LabVIEW Measurements Manual, Apr. 2003 Edition, Part No. 322661 B-01, 159 pages.*
LabVIEW Getting Started with LabVIEW, Apr. 2003 Edition, 78 pages.*
BridgeVIEW™ and LabVIEW™, G Programming Reference Manual, Jan. 1998 Edition, Part No. 321296B-01, 667 pages.*
Anylogic User's Manual, XJ Technologies Company Ltd., pp. 2-4, 8-9, 21-3, 41-3, 55-7, 155-6, 218-221, 270-1 (1992-2004).
Bailey, Stephen A. et al., "1076.1 Ballot Resolution Committee, Comment Resolution Report," retrieved online at http://www.eda.org/vhdl-ams-ftp_files/lang_design/BRC/CRR15_meta-issues.txt (2005).
Berkeley.edu, Ptolemy II Frequently Asked Questions, retrieved online at http://ptolemy.eecs.berkeley.edu/ptolemyII/ptIIfaq.htm, pp. 1-10, (2005).
Bhattacharyya, Shuvra et al., The Almagest, vol. 1—Ptolemy 0.7 User's Manual, University of California at Berkeley, 532 pages (1997).
Chen, Gilbert et al., "Lookahead, Rollback and Lookback: Searching for Parallelism in Discrete Event Simulation," retrieved online at http://citeseer.ist.psu.edu/551717.html, 5 pages, (2002).
Clune, M., et al., Panel session on, "Challenges and solution techniques for hybrid simulation," 43rd IEEE Conference on Decision and Control, 1 page, (2004).
Connell, Jon et al., "Early Hardware/Software Integration Using SystemC 2.0," retrieved online at http://www.synopsys.com/products/designware/system_studio/esc_paper_552.pdf, 11 pages, (2002).
Diamond, Bob et al., "Extend, User's Manual, Version 4, for Macintosh or Windows," Imagine That, Inc., 244 pages, (1997).
Fall, K. et al., "The ns manual (formerly ns notes and documentation)," The VINT Project, Chpts. 4-8, pp. 37-85, Chapt. 11, pp. 110-114 (2005).
Fujimoto, R., "Parallel discrete event simulation," Communications of the ACM, pp. 1-8 (1990).
Grand Valley State University, "Sequential Function Charts," retrieved online at http://www.eod.gvsu.edu/~jackh/books/plcs/chapters/plc_sfc.pdf, 11 pages, (2007).
Grotker, Thorsten, "SystemC, Transaction Level Modeling with SystemC," Synopsys, INc., retrieved online at http://www.ti.informatik.uni-tuebingen.de/~systemc/Documents/Presentation-7-TLM_groetker.pdf (2002).
Haverinen, Anssi et al., "White Paper for SystemC™ based SoC Communication Modeling for the OCP™ Protocol," retrieved online at http://www.ocpip.org/data/ocpip_wp_SystemC_Communication_Modeling_2002.pdf, 39 pages, (2002).
Holz, E., "SDL-2000 Tutorial," Formal Methods Europa, 49 pages (2001).
Hzeeland.nl, "Introduction to VHDL—A Tutorial," retrieved online at http://www.hzeeland.nl/~wrijker/dsy/vhdl/algemvhdl/fcmi/vhdlintro.html, 16 pages, (2005).

Information Science Institute, "The Network Simulator—ns-2," retrieved online at http://www.isi.edu/nsnam/ns/, 2 pages, (2005).
International Engineering Consortium, "Specifications and Description Language (SDL)," retrieved online at http://www.iec.org/online/tutorials/acrobat/sdl.pdf, 21 pages, (2005).
Liu, J. et al., "Actor-Oriented Control System Design: A Responsible Framework Perspective," IEEE Transactions on Control Systems Technology, vol. 12(2):250-262 (2004).
Liu, J. et al., "Component-based hierarchical modeling of systems with continuous and discrete dynamics," Proceedings of the 2000 IEEE International Symposium on Computer-Aided Control System Design, pp. 95-100 (2000).
Liu, J. et al., "Motivating hierarchical run-time models for measurement and control systems," Ptolemy Miniconference, Berkeley, CA, pp. 1-3 (2001).
Liu, J., et al., "System-level modeling of continuous and discrete dynamics," Ptolemy Miniconference, Berkeley, CA, pp. 1-4, (2001).
Liu, Liang Y. et al., "Graphical Object-oriented Discrete-event Simulation System," Proceedings of the 1992 Winter Simulation Conference, pp. 1285-1291 (1992).
Martin, Dale E. et al., "Analysis and Simulation of Mixed-Technology VLSI Systems," Journal of Parallel and Distributed Computing, vol. 62:468-493 (2002).
Martin, R.C., "UML tutorial: Sequence diagrams," Engineering Notebook Column, pp. 1-5, (1998).
Mentor Graphics, "Fundamentals of VHDL-AMS for High-Speed Buffer Modeling," Mentor Graphics Corporation, www.mentor.com/systemvision, 62 pages (2002).
Mosterman, Pieter J. et al., "Modeling Petri Nets as Local Constraint Equations for Hybrid Systems Using Modelica™," retrieved online at http://citeseer.ist.psu.edu/359408.html, 6 pages, (1998).
National Instruments, "Building the Block Diagram," LabVIEW User Manual, Chapter 5, pp. 5-1-5-29 (2003).
Naumann, Rolf, "Graphical design environment for CAMeL-Tools," http://wwwcs.uni-paderborn.de/SFB376/projects/c1/Paper/vcamel.html., pp. 1-10 (1996).
Murata, Tadao, "Petri Nets: Properties, Analysis and Applications," Proceedings of the IEEE, vol. 77(4):541-580 (1989).
OPNET Technologies, Inc., "Modeler, Accelerating Network R&D," retrieved at www.opnet.com, 4 pages, (2004).
Overhauser, David, et al., "Evaluating mixed-signal simulators," IEEE 1995 Custom Integrated Circuites Conference, pp. 113-120 (1995).
Overhauser, David, et al., "IDSIM2: An Environment for mixed-mode simulation," IEEE 1995 Custom Integrated Circuits Conference, vol. 5(2):1-4 (1990).
Perumalla, Kalyan et al., "Using reverse circuit execution for efficient parallel simulation of logic circuits," retrieved online at http://www.cc.gatech.edu/~kalyan/papers/rccircuit-spie02.pdf, 9 pages, (2001).
Rensselaer Polytechnic Institute, "Parallel Discrete Event Simulation," retrieved online at http://www.rpi/edu/~gucluh/pdes.html, 4 pages, (2005).
Rockwell Automation, "IEC 1131 Sequential Function Charts," retrieved online at http://www.software.rockwell.com/corporate/reference/lec1131/sfc.cfm, 2 pages, (2007).
Siegmund, Robert et al., "Efficient Modeling and Simulation of Data Communication Protocols in Communication-oriented Designs using the SystemCSV Extension," retrieved online at http://www-ti.informatik.uni-tuebingen.de/~systemc/Documents/Presentation-4-UP5_siegmund.pdf, 21 pages, (2003).
SIMUL8 Corporation, "SIMUL8 Feature Tour," retrieved online at http://www.simul8.com/products/features/, 2 pages, (2005).
SIMUL8 Corporation, "SIMUL8 Professional—Normally $4995 but $3995 til May 31," retrieved online at http://simul8-online.com/products/s8prof.htm, 2 pages, (2005).
System C Version 2.0 Users Guide, "Update for SystemC 2.0.1," Chapter 1, pp. 1-8; Chapter 2, pp. 9-38; Chapter 5, pp. 71-82 (1996-2002).
Vlach, Martin, "Modeling and simulation with Saber," Third Annual IEEE ASIC Seminar and Exhibit, T-11.1-T-11.9 (1990).
Xia, Zheng et al., "Distributed Combined Discrete-Continuous Simulation for Multiple MAVs Motion Analysis," Proceedings of

(56) References Cited

OTHER PUBLICATIONS the 2003 International Symposium on Collaborative Technologies and Systems, vol. 35(1):162-167 (2003).
Zeigler, B.P., et al., "Creating simulations in HLA/RTI using the DEVS modeling framework," DEVS/HLA Tutorial, 1 page, (1998).
"Simulink: Model-Based and System-Based Design," Using Simulink, Version 5, The MathWorks, Inc., Jul. 2002, pp. 1-476.
"Meta Issues," EDA, <http://www.eda.org/vhdl-ams/ftp_files/lang_design/BRC/ORR15_Meta_issues.txt>, retrieved from the Internet on Apr. 13, 2005, pp. 1-10.
Grötker, Thorsten, "System C™: Transaction Level Modeling with SystemC", Synopsys, Inc., 2000, pp. 1-27.
Henriksson, D. et al., "TrueTime 1.2—Reference Manual," Oct. 2004, pp. 7-79.

* cited by examiner

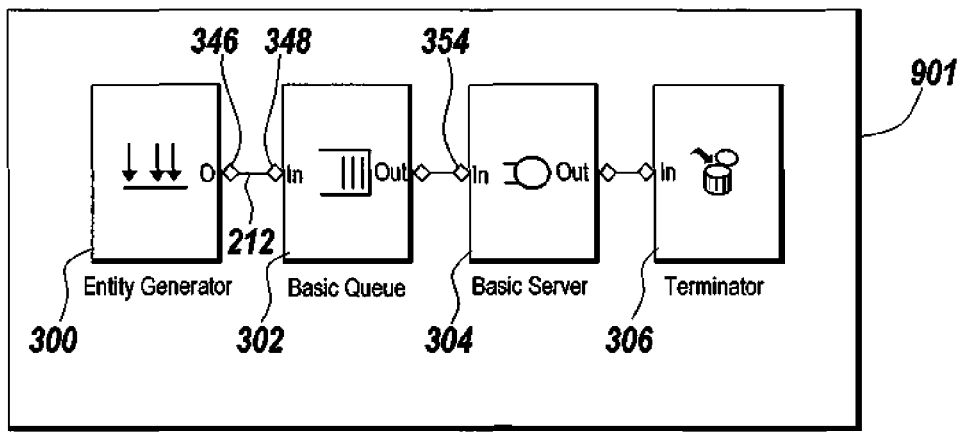
*Fig. 8*
| Time of Event (s) | Type of Event |
|---|---|
| 0.9 | Entity Generator block generates an entity |
*Fig. 9*
| Time of Event (s) | Type of Event |
|---|---|
| 1.7 | Entity Generator block generates second entity |
| 2.2 | Basic Server block completes service on the first entity |
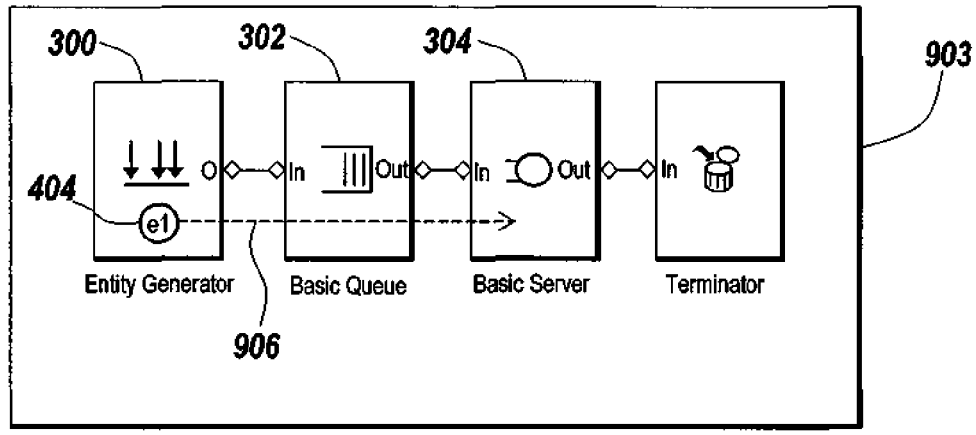
*Fig. 10*

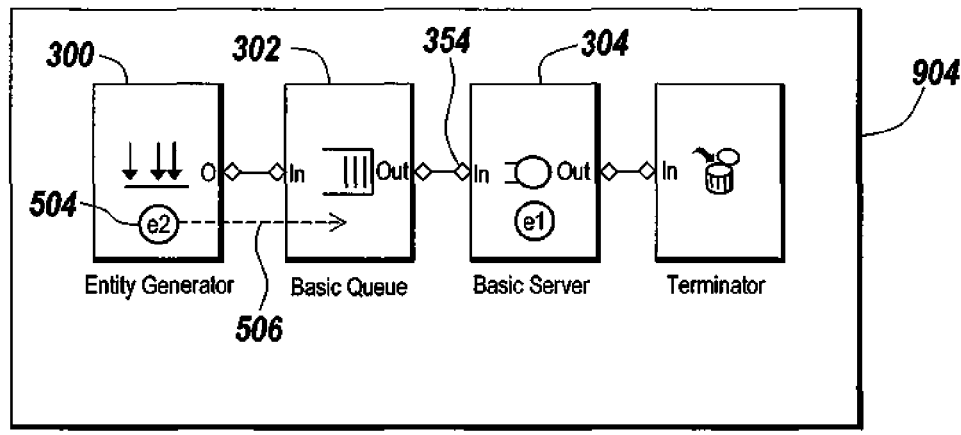
*Fig. 11*
| Time of Event (s) | Type of Event |
|---|---|
| 2.2 | Basic Server block completes service on the first entity |
| 3.8 | Entity Generator block generates the third entity |
*Fig. 12*
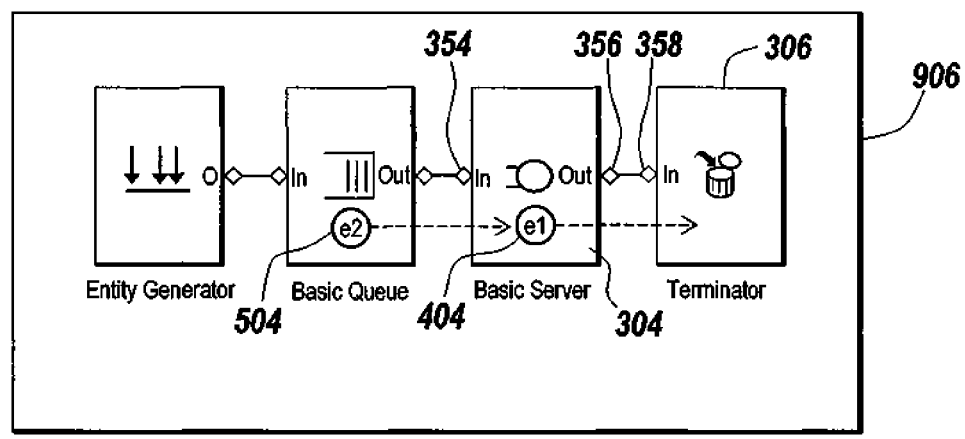
*Fig. 13*

| Time of Event (s) | Type of Event |
|---|---|
| 3.8 | Entity Generator block generates the third entity |
| 4.2 | Basic Server block completes service on the second entity |

| Time of Event (s) | Type of Event |
|---|---|
| 3.9 | Entity Generator block generates the fourth entity |
| 4.2 | Basic Server block completes service on the second entity |

| Time of Event (s) | Type of Event |
| --- | --- |
| 4.2 | Basic Server block completes service on the second entity |
| 6 | Entity Generator block generates the fifth entity |

909

| Time of Event (s) | Type of Event |
|---|---|
| 4.9 | Basic Server block completes service on the third entity |
| 6 | Entity Generator block generates the fifth entity |

*Fig. 19*

| Time of Event (s) | Type of Event |
|---|---|
| 2.1 | Entity Generator block generates the first entity |
| 2.1 | Entity Generator block generates the second entity |
| 2.3 | Basic Server block completes service |

*Fig. 20*

| Time of Event (s) | Type of Event | Priority |
|---|---|---|
| 2.1 | Entity Generator block generates the first entity | 1 |
| 2.1 | Entity Generator block generates the second entity | 2 |
| 2.3 | Basic Server block completes service of third entity | 3 |

*Fig. 21*

GRAPHICAL REPRESENTATION OF PORTS OF MULTIPLE TYPES

RELATED APPLICATION

This application is a continuation of U.S. patent application Ser. No. 11/022,249, filed on Dec. 21, 2004, which claims priority to, and the benefit of, U.S. Provisional Application No. 60/611,576, filed on Sep. 20, 2004, for all subject matter common to the applications. The disclosure of the above-mentioned applications is hereby incorporated by reference herein in its entirety.

FIELD OF THE INVENTION

The present invention relates to the graphical representation of ports within a block diagram that are of multiple types, and more particularly to the graphical representation of input and output ports to blocks of a block diagram representation, such that each different port representation relates information as to the type of data able to pass through the port.

BACKGROUND OF THE INVENTION

Generally, graphical analysis, simulation, and execution methods are used in modeling, design, analysis, and synthesis of engineered systems. These methods provide a visual representation of a model, such as a block diagram. The visual representation provides a convenient interpretation of model components and structure. The visual representation also provides a quick intuitive notion of system behavior. The components of a block diagram can also capture the mathematical representation of the actual system being modeled.

Historically, time-based block diagram models have been used in scientific areas, such as Feedback Control Theory and Signal Processing. Time-based block diagrams are used to study, design, debug, and refine dynamic systems representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, and the like.

Professionals from diverse areas such as engineering, science, education, and economics build mathematical models of dynamic systems to better understand system behavior as it changes with the progression of time. The mathematical models aid in building better systems, which can be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may serve to educate users on the basic principles governing physical systems. The models and results are often used as a scientific communication medium between humans. The term "model-based design" refers to the use of graphical models in the analysis, development, validation, and operation of dynamic systems.

Dynamic systems are typically modeled in modeling environments as sets of differential, difference, and/or algebraic equations. At any given instant of time, these equations may be viewed as relationships between the system's output response ("outputs"), the system's input stimuli ("inputs") at that time, the current state of the system, the system parameters, and time.

Time-based block diagram modeling has become particularly attractive over the last few years with the advent of software packages to process large amounts of data and perform a high number of computational iterations. In fact, various classes of graphical models enable a user to describe a system and related computations that can be performed on application specific computational hardware, such as a computer, microcontroller, FPGA, or custom hardware. Classes of such graphical models include time-based block diagram execution applications such as SIMULINK® from the MATHWORKS, Inc. Natick Mass., and state-based flow diagram execution applications such as Stateflow® from the MATHWORKS, Inc. Natick Mass., in addition to other models such as data flow diagrams, UML, VHDL, analog extension, and the like.

A common characteristic among these various forms of block diagram execution applications is that they define semantics of how to execute the diagram, and thus they specify how to model a dynamic system. Such applications provide sophisticated software platforms with a rich suite of support tools that make the analysis and design of dynamic systems efficient, methodical, and cost-effective. Furthermore, such applications can support the modeling of linear and nonlinear systems. The systems may be modeled in continuous time, sampled (or discrete) time, or a hybrid of continuous and discrete time. Systems can also be multirate, i.e., have different parts that are sampled or updated at different rates.

Time can be an inherited component of block diagram execution applications in that the results of a block diagram execution are dependent on time and as such, vary with time. In other words, a block diagram execution or model represents the instantaneous behavior of a dynamic system and models that system over time. Determining a system's behavior over time requires repeatedly executing a model of the system at intervals, called time steps, from the start of the time span to the end of the time span.

Systems may be categorized by the type of time step being used (fixed-step or variable-step). A fixed-step system is one that uses a fixed-step solver. A variable-step system is one that uses a variable-step solver. A solver is a module of the execution engine that is responsible for performing two tasks: (1) determining how far execution time should be advanced between consecutive passes through a system in order to accurately trace the system's outputs, and (2) integrating the derivative of the states of the system to obtain the actual states. Based on how solvers perform the first task, they are generally classified into two basic classes: Fixed-step solvers or Variable-step solvers. Fixed-step solvers often use explicit methods to compute the next continuous state at fixed periodic intervals of time. A variable-step solver can use either implicit or explicit methods to compute the next continuous state at non-periodic intervals of time. Generally, variable-step solvers use a form of error control to adjust the interval size such that the desired error tolerances are achieved.

Solvers can also be categorized into two classes with respect to time: continuous-time solvers and discrete-time solvers. Continuous-time solvers use numerical integration to compute a model's continuous states at the current time step from the states at previous time steps and the state derivatives. Continuous-time solvers rely on the model's blocks to compute the values of the model's discrete states at each time step. Mathematicians have developed a wide variety of numerical integration techniques for solving the ordinary differential equations (ODEs) that represent the continuous states of dynamic systems. Continuous-time solvers can further be separated into fixed-step continuous-time solvers and variable-step continuous-time solver. Discrete-time solvers exist primarily to solve purely discrete models. They compute the next execution time step for a model and nothing else. They do not compute continuous states and they rely on the model's blocks to update the model's discrete states. Similarly, discrete-time solvers can also be further separated into fixed-step discrete-time solvers and variable-step discrete-time solvers.

SIMULINK® is an example of an interactive graphical modeling tool that enables users to quickly create, model, simulate, and test block diagram representations of dynamic systems. Simulink SIMULINK® uses time-dependent models. It is suitable for simulating time-varying systems. FIG. 1 shows an example of a SIMULINK® model. The SIMULINK® model makes use of blocks and arrows to connect the blocks, when forming the model. Each arrow connecting one enabled block to another represents a signal having a value at all times. The arrow indicates the direction of the signal as the signal varies with time.

In time-based models, in order to know what happens with the system at a specific time in the future (such as at time equals 1000 seconds) the model must be initiated at a time of n seconds, where n is less than 1000 and the behavior at time n is known, and stepped through time to arrive at the 1000 second mark. For example, the model can be executed as follows in accordance with one example implementation embodiment. Input signal 100 generates an input signal and sends the signal to a Sum block 102 via link 110. Sum block 102 adds the signal from link 110 and a second link 116 and outputs the result in the form of link 112. At execution start time, link 116 has a signal of value zero. Integrator block 104 takes the signal from link 112 and performs integration on the input signal and outputs the result through link 114. Link 114 communicates the signal from the Integrator block 104 to a Scope block 108 for display, and also sends the signal to Gain block 106 through 116. Gain block 106 performs calculation on the input signal from link 114 and outputs the result through link 116 back to the Sum block 102. The Sum block 102 adds the signal from link 110 and the new updated signal from link 116 and outputs the result through link 112 to the Integrator block 104. The Integrator block 104 takes the updated signal from link 112 and performs integration on the value forwarded by the signal to produce an updated output on link 114. The model continues on until a predetermined condition is achieved, a time period is attained, or the user interrupts the execution.

Dynamic systems can also be modeled from a state-based perspective. The state of the system may be thought of as a numerical representation of the dynamically changing configuration of the system. For instance, in a model of a simple pendulum, the state may be viewed as the current position and velocity of the pendulum. Similarly, in a model of a signal-processing system that filters a signal the state would be a set of previous inputs. The system parameters are the numerical representation of the static, or unchanging, configuration of the system and may be viewed as constant coefficients in the equations modeling the system. For the pendulum example, a parameter is the length of pendulum: for the filter example, a parameter is the values of the filter taps.

Stateflow® is an example of a state-based dynamic system modeling application. Stateflow® is configured as a tool in SIMULINK® that can be used to design embedded systems that contain control, supervisory, or mode logic. By using Stateflow® with SIMULINK®, users can create models that combine state transition behavior (for example, fault detection or mode switching) with algorithmic continuous-time and discrete-time behavior (for example, feedback control or signal conditioning). Users can also create a model of the system and its environment in SIMULINK® and run hybrid executions to study the interactions between the two.

In SIMULINK® a Stateflow® block uses a state diagram to represent an object with a discrete set of modes. These modes are known as states. A Stateflow® chart is a graphical representation of a finite state machine where states and transitions form the building blocks of the system. Stateflow® charts enable the graphical representation of hierarchical and parallel states and the event-driven transitions between them. The Stateflow® finite state machine reacts to events by changing states for the controlled object. A control object can be a motor, a pump, or any device that changes the behavior of the model to control its operation. The behavior of the object depends on what state the object is in and how the object changes from one state to another.

In the specific example application Stateflow®, the modeling process for modeling state-based executions, is embedded in SIMULINK®. Thus, the execution is invoked by SIMULINK® or some other time based dynamic modeling application, and does not run independently. In the case of Stateflow®, as execution starts, SIMULINK® starts its clock. When the execution engine reaches a Stateflow® block, the SIMULINK® clock stops ticking, and the execution engine passes information to Stateflow®, and awaits a signal back from Stateflow®. Stateflow® then performs its state-based modeling process. Once all the Stateflow® blocks finish their execution, outputs are sent to SIMULINK®, and the SIMULINK® clock starts ticking again. Therefore, during the execution of Stateflow® blocks, the execution is instantaneous, i.e., has no time effect on the SIMULINK® model. All the events and state transitions that occur in Stateflow® are considered to have taken place at the specific moment in time when the clock stops.

An example of a Stateflow® form of state diagram model is shown in FIG. 2. Each arrow in the Stateflow® diagram also has values like the SIMULINK® arrows, but these values represent a decision value relating information that can cause one state to transition to another. The arrows in Stateflow® also indicate the direction of the signals. The exemplar Stateflow® diagram as shown in FIG. 2 is embedded in a SIMULINK® environment as shown in FIG. 3. The SIMULINK® signals are provided to Stateflow®, and Stateflow® uses this information to decide whether there are changes in states.

More specifically, in operation, a state flowchart 136 diagram is shown in FIG. 2, which corresponds to a detailed description of the flowchart 136 shown in FIG. 3. In FIG. 3, port data temp 158 receives a signal from the output of physical plant 146. Port temp_min 156 receives a value from a constant block 144 in SIMULINK® as the minimum set point temperature for the physical plant. Data switch 136 receives data from SIMULINK® constant block 140 or 142 indicating whether the switch should be on or off. Output port speed 160 on the state flowchart is then calculated based on input values 154, 156, and 158. Physical plant 146 receives data from output port speed 160 for further calculations within the physical plant 146. Within the state flowchart 136 as shown in FIG. 2, there are two states: an on state 120 and an off state 122. The default transition 126 determines the initial state is the off state 122. When an on switch transition 130 is enabled, the enable signal passes to junction 124 and determines whether the temp 158 data is greater or equal to 30, if not, then the enable signal is passed on to signal link 132 and further finish the transition to the on state 120. Now the on state 120 is active and off state 122 inactive. The off state 122 will become active again when the off switch signal 128 is enabled, at which time the on state 120 will be inactive.

One notable difference between SIMULINK® (and similar dynamic modeling programs) and Stateflow® (and similar state modeling programs) is that Stateflow® models in state changes of discrete events and is implemented within the time-driven environment, whereas SIMULINK® is modeled in continuous time or discrete time and is the time-driven environment. Said differently, SIMULINK® is a time-driven engine and Stateflow® is an event-driven engine embedded and initiated in a time-driven environment.

Dynamic systems are typically modeled in execution environments as sets of equations. At any given instant of time, the equations output values that can be considered states, and can also be communicated to state flow modelers. Thus, users conventionally have the ability to model using time-driven equations, and/or event-driven models controlled by time-driven equations. For example, if a user wants to know how fast a school bus is traveling at a specific moment in time, the user can use SIMULINK® to model the speed of the school bus. If part of the determination of the speed is what gear the school bus transmission is in, the gear indication can be modeled in Stateflow® within the SIMULINK® speed model.

Stateflow®, and similar state modeling applications, are therefore utilized where the location and exact behavior of objects are not important but actions taken or completed on or by the objects are of interest. Such state flowchart models are currently invoked by the time driven dynamic modeling environments, such as that of SIMULINK®. Hence, if only a small number of Stateflow® calls are made by SIMULINK®, delays can be practically non-noticeable.

However, returning to the school bus example, if the user wants to know in the event of an emergency how fast the school children can get off the school bus, then the user must attempt a highly complex combination of time-driven equations and embedded event-driven models in time-driven environments to approximate the movement of each child off the bus. In SIMULINK®, such a model will also track the exact position of each child, despite the fact that whether a child has progressed one centimeter forward is not the focus of such a model. Regardless, such information must be tracked in the time dependent graphical model. Also, in such a model, the clock time that each child leaves the bus is unimportant. However, the number of children getting off the bus, the intervals between each child getting off the bus, and the position of the child as either remaining on the bus or being safely off the bus, are what is desired to be modeled. Such events are highly complex to model in time-driven model executions and state-based model executions operating in time-driven environments.

Furthermore, if a user wants to model network traffic and to determine how fast a router can relay millions of packets, it is computationally costly to use the state flowchart model within the dynamic block diagram time driven environment because such configurations require constant calls between programs. Hence, the delay in execution output can be very noticeable, and can even approach the hardware processing limitations and bog down an execution to the point of ineffectiveness.

SUMMARY

There is a need for a discrete event modeling application that can model such events as described above, and operate in conjunction with other applications and environments. In accordance with the implementation of different modeling programs operating in different environments, a difficulty arises in being able to differentiate different types of inputs, outputs, data, and environments, within a single graphical model representation. Thus, the present system and method for representing ports of multiple different types addresses this need.

In accordance with one embodiment of the present invention, in a discrete event system (DES) environment, a method of graphically displaying ports includes providing a graphical representation of an executable model having at least one DES component and at least one entity able to pass through the model, wherein the at least one entity holds at least one value of arbitrary data type, and wherein an entity definition is updatable during execution of the model. A first port of the DES component and a second port of the DES component are provided, wherein the first port is indicated by a first symbol representing a port type of the DES environment and the second port is indicated by a second symbol representing a port type of a non-DES environment.

In accordance with aspects of the present invention, the graphical representation of the executable model includes a DES block diagram. The DES component can likewise be a block.

In accordance with further aspects of the present invention, the first port can be one of an input port and an output port to the component. The second port can likewise be one of an input port and an output port to the component.

In accordance with further aspects of the present invention, the non-DES environment can be a continuous time-based model execution environment, a discrete time-based model execution environment, a dataflow environment, and/or a state-based model execution environment. The at least one DES component can be configured within a hierarchically configured model. At least one DES component can be configured within a subsystem of the model. The port type can be an output trigger port, an output function call port, an input trigger-callable port, an input function-callable port, and/or an input enabled port. The port type is identifiable by the first symbol and the second symbol.

In accordance with one embodiment of the present invention, in an electronic device, a system providing a graphical representation of a DES environment includes a graphical representation of an executable model having at least one DES component and at least one entity able to pass through the model, wherein the at least one entity holds at least one value of arbitrary data type, and wherein an entity definition is updatable during execution of the model. The system further includes a first port of the DES component and a second port of the DES component. The first port is indicated by a first symbol representing a port of the DES environment and the second port is indicated by a second symbol representing a port of a non-DES environment.

In accordance with aspects of the present invention, the graphical representation of the executable model includes a DES block diagram. The DES component can be a block.

In accordance with further aspects of the present invention, the first port can be one of an input port and an output port to the component. Likewise, the second port can be one of an input port and an output port to the component.

In accordance with further aspects of the present invention, the non-DES environment can be a continuous time-based model execution environment, a discrete time-based model execution environment, a dataflow environment, and/or a state-based model execution environment. The at least one DES component can be configured within a hierarchically configured model. The at least one DES component can be configured within a subsystem of the model. The port type can be an output trigger port, an output function call port, an input trigger-callable port, an input function-callable port, and/or an input enabled port. The port type is identifiable by the first symbol and the second symbol.

In accordance with one embodiment of the present invention, a medium for use in a DES environment on an electronic device is provided. The medium holds instructions executable using the electronic device for performing a method of graphically displaying ports. The method includes providing a graphical representation of an executable model having at least one DES component and at least one entity able to pass through the model, wherein the at least one entity holds at least one value of arbitrary data type, and wherein an entity definition is updatable during execution of the model. The method can further include providing a first port of the DES component and a second port of the DES component. The first port is indicated by a first symbol representing a port of the DES environment and the second port is indicated by a second symbol representing a port of a non-DES environment.

BRIEF DESCRIPTION OF THE DRAWINGS

The present invention will become better understood with reference to the following description and accompanying drawings, wherein:

FIG. 8 is an illustrative embodiment of a Discrete event system model environment;

FIG. 9 is an illustrative representation of the Event calendar for use with the present invention;

FIG. 10 is an illustrative embodiment of the event calendar and system model of the present invention;

FIG. 11 is an illustrative embodiment of a Discrete event system model environment;

FIG. 12 is an illustrative embodiment of the event calendar and system model of the present invention;

FIG. 13 is an illustrative embodiment of a Discrete event system model environment;

FIG. 19 is an illustrative embodiment of the event calendar of the present invention;

FIG. 20 is an illustrative embodiment of the event calendar of the present invention;

FIG. 21 is an illustrative embodiment of the event calendar containing priority data for use with the present invention;

DETAILED DESCRIPTION

Figure 1:
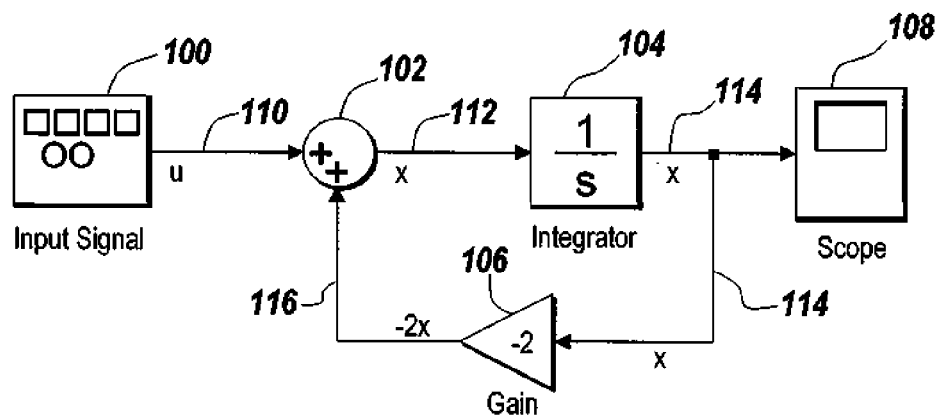
FIG. 1 is an illustrative embodiment of a SIMULINK® model for use with the present invention.
Figure 2:
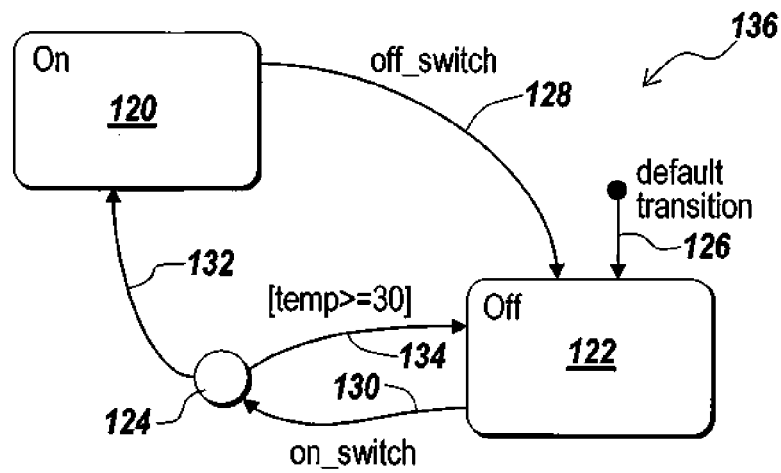
FIG. 2 is an illustrative embodiment of a StateFlow® model for use with the present invention.
Figure 3:
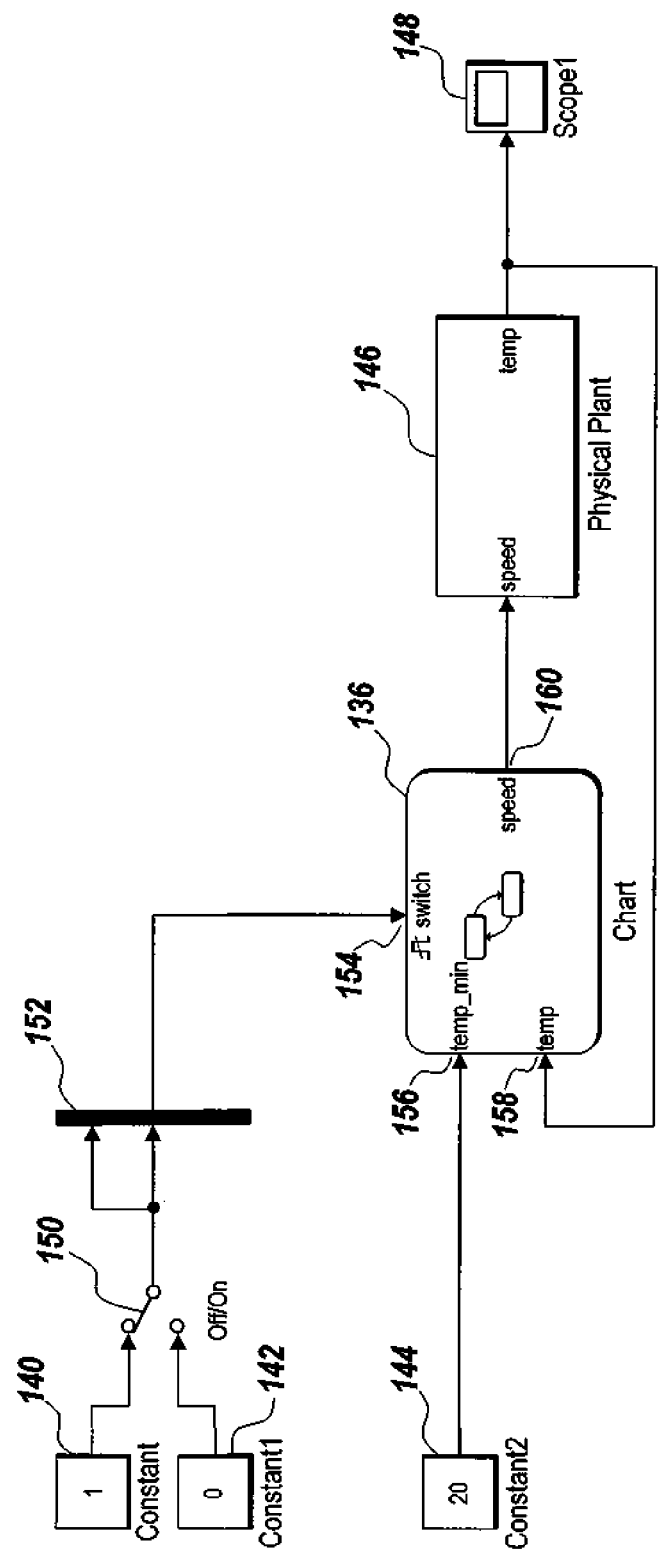
FIG. 3 is a hybrid external environment for use with the present invention.

An illustrative embodiment of the present invention relates to a system and method for representing different port types within blocks of graphical model representations. The primary difference between the port types is determined based on a particular environment with which the port is able to communicate. Ports of different types are indicated by different graphical representations.

Environments, as utilized herein, can differ according to a number of different factors and include but not be limited to a DES model environment, a time-based (continuous and discrete) simulation or model environment, a state-based simulation or model environment, data-flow simulation or model environment in which data flow is mapped to time, and environments that operate based on communicating signals, data, constraints, entities, states, conditions, operations, functions, and/or triggers, and the like.

FIGS. 4 through 25B, wherein like parts are designated by like reference numerals throughout, illustrate example embodiments of an event driven discrete event system (DES) modeler, and aspects of graphical representations of event driven DES models, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

Therefore it is desired to provide a modeling environment that can model the occurrence of events independent of continuous model time. An event driven discrete event system (DES) modeling environment is one wherein the systems state transitions depend on asynchronous discrete incidents called events. Such a model execution differs greatly from a time based model execution, such as SIMU-LINK®, wherein the model is time dependent.

Figure 4:
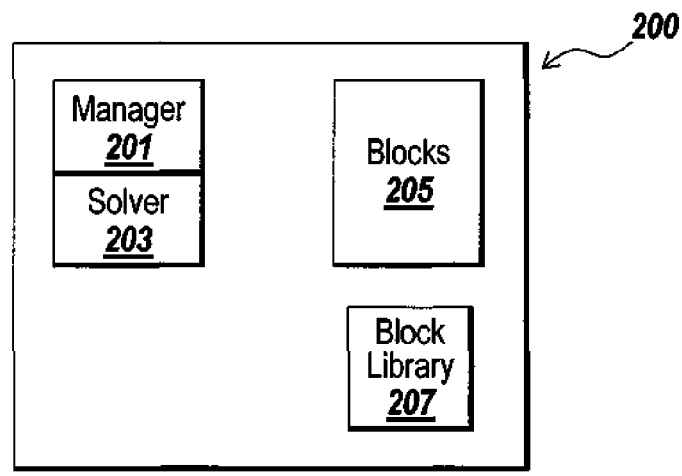
FIG. 4 is an illustrative example of a Discrete event system model environment for use with the present invention.

In reference to FIG. 4, a DES model environment 200 is provided. The DES model environment 200 includes an event modeling manager 201. The manager 201 coordinates the operation of the DES model environment to process model executions. The manager 201 includes a solver 203, which processes the DES model configured in the DES model environment 200. The manager 201 provides for the implementation of the DES model environment 200 by supporting the creation of DES blocks 205 that represent various aspects of the DES model. The blocks 205 can represent different portions of the model as later described herein. Example blocks include an entity generator, a queue, a server, and a terminator, in addition to other blocks having specific tasks and implementations. A block library 207 can be provided that is customized for operation within the DES environment. Furthermore, the block library in the present DES modeler is not industry specific, thereby providing for numerous user-defined applications.

A primary data component within the DES model is referred to as an entity. Entities are abstract representations of areas of interest within the DES model and may vary depending upon that which is being modeled by the DES system. Entities are the items that pass from block to block in the DES modeling environment. For example, when modeling a digital network, an entity may represent a data packet. In another example, when modeling a manufacturing plant, entities may take the form of individual items on the assembly line. Each DES model has at least one entity within the model.

The blocks 205 are interconnected using block connectors that pass entities and other information between blocks. The information can include information from other models or data sources or references that have some contribution to the creation or operation of the entities as they pass through the DES model. The blocks can also have block connectors that pass information out to other models or data sources outside of the DES model.

In operation, the DES model environment 200 makes use of the various blocks to organize and manipulate entities through the DES model. For example, the manager 201 manages the configuration of multiple blocks 205 to form the DES model. Blocks 205 can be placed in the model for entity generation, subsequent entity manipulation, and eventually entity termination. The basic operation of the DES model involves passing the entities through the blocks according to instructions governed by the manager 201 and solver 203. The manager 201 can be represented by an event calendar, wherein the event calendar serves to drive the DES model forward by executing the next scheduled event in the event calendar. The solver 203 in the present invention is a DES specific mechanism which allows for the execution of events in the DES event calendar in light of operations that can occur in the external environment. The solver 203 of the present invention, therefore, is in communication with the external environment and can notify the external environment of events within the DES environment which can affect the semantics of the external environment.

Nominally, an entity contains a set of attributes associated with the entity. However, an entity can contain as few as zero attributes. An attribute can be a field wherein the attribute is named and the attribute type is defined. For example, a field can define the entity type as a Boolean, a real number, an integer number, an enumerated type, a string, a vector, a matrix, a frame, and the like, such that the entity is of arbitrary data type. An arbitrary data type represents an arbitrarily complex structure containing data that may include hierarchical composition. The contained data can be as general as a single bit of information and any sequence of such bits representing characters, numeric values, or any other syntactic and semantic datum. Furthermore, an entity can contain sub-entities. Sub entities can be utilized in numerous operations such as recursive nesting or combining hierarchies.

The generation of entities can be automatic, or can be user-defined. User-defined entities allow users within a specific industry to define those attributes that are specific to their needs. The entity can then be incorporated into a DES model, thereby providing great user flexibility. Entities can further incorporate randomness into their behavior via probability distributions associated with blocks generating each entity. These probability distributions can be representative of the probability of an entity being generated based upon a set of defined variables. Probability distribution can be user defined or can be generated automatically, such that a probability of an event occurring drives entity generation within the model. Furthermore, the generation of a probability distribution may be accomplished utilizing other applications or environments, such as but not limited to the MATLAB® environment or the SIMULINK® environment.

It should further be noted that there can be a relationship between attributes and random numbers as well. When setting attributes of entities, the user can assign values based on input from separate environments, such as SIMULINK®, to attributes in passing entities. Such separate environments can allow the values to be drawn from a probability distribution. The separate environment thus allows the attributes to be assigned samples from random variables. These random values can be used to introduce randomness in a controlled way to other parts of the model when they move into those parts of the model.

Figure 5:
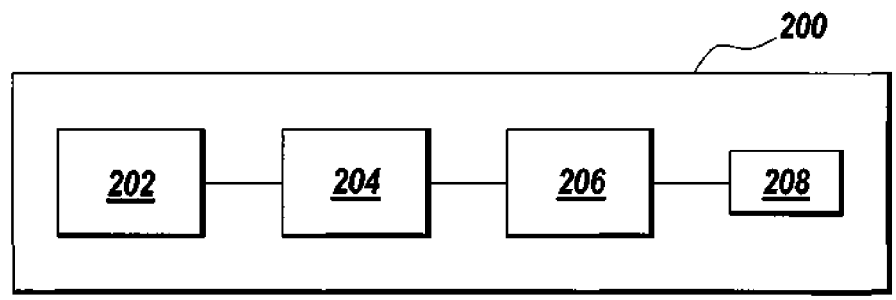
FIG. 5 is an illustrative embodiment of a Discrete event system model environment.

FIG. 5 depicts a sample DES model environment 200. The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, SIMULINK® can be used as a source for the present DES modeler, wherein a SIMULINK® signal can trigger the generation of an entity for use in the DES model based upon criteria set by a DES modeler user.

Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block that allows the export of a signal from the DES model to an external environment. For example the DES modeler of the present invention can include a block that receives an entity and outputs a SIMU-LINK® signal that may be used in a SIMULINK® environment.

FIG. 5 depicts a sample DES model environment 200. The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, Simulink® can be used as a source for the present DES modeler, wherein a Simulink signal can trigger the generation of an entity for use in the DES model based upon criteria set by a DES modeler user.

Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block that allows the export of a signal from the DES model to an external environment. For example the DES modeler of the present invention can include a block that receives an entity and outputs a Simulink® signal that may be used in a Simulink® environment.

In the present invention, entities generally pass from sources 202 to sinks 208. Entities can, however, traverse numerous intermediate blocks 204, 206 on the pathway from source 202 to sink 208. These intermediate blocks 204, 206 can be represented by numerous specialized DES blocks within the block library of the present DES modeler.

These intermediate blocks can have the same functionality as described above for the sinks. For example, the intermediate blocks can display all of the attributes passed to them, or can display a defined set of variables. The intermediate blocks can have conditions to define which entities can pass through them. Scope Blocks can serve as intermediate blocks that accept an entity and plot data from the entity in a graphical manner. Display Blocks can also display selected attributes of an entity. Furthermore, the intermediate blocks can include blocks that export a signal from the DES model to an external environment, or import a signal or other input information from an external environment.

Figure 6:
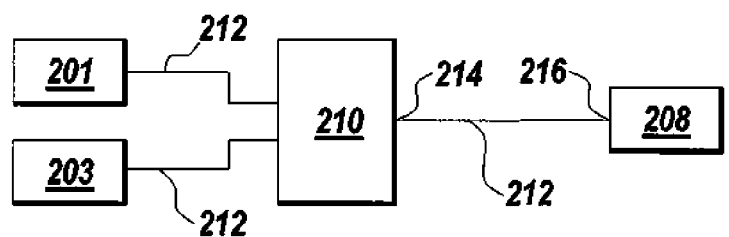
FIG. 6 is an illustrative embodiment of a Discrete event system model environment.

FIG. 6 depicts an example of an intermediate block utilized in accordance with one embodiment of the present invention. A Routing Block 210 may be placed between two source blocks 201, 203 such that only a subset of entities is passed to a sink block 208. The subset is determined by the logic of the Routing Block 210 and the data that it uses to determine the path from which the entity is allowed to arrive. Additional intermediate blocks that can be used in accordance with the present invention include, but are not limited to Logical Gates, Queuing Blocks, Storage Blocks, Routing Blocks, Execution Control Blocks, Server Blocks, Resource Allocation Blocks, Timer Blocks, Timeout Blocks, and Delay Blocks. Additionally, the DES environment allows for users to customize and define their own blocks specific to the problem they are modeling and the model they have developed.

The path that an entity takes through the DES modeler environment, as depicted in FIG. 6, is an entity path 212. The entity path 212 is any connection from an entity output port 214 to an entity input port 216 on a block within the DES modeler. For illustrative purposes, these entity paths are represented by a line connecting the entity input 214 and output ports 216 of blocks within the DES model environment. The entity path 212 in the DES model environment is active only when an entity is passing through the entity path 212. At times when there is no entity passing through the entity path 212 in the execution, the entity path has no value associated with it.

Further, there may be associated with each block in a DES environment a state, wherein the state is a persistent data set corresponding to the block. The state variable of a block contains a set of attributes associated with the block (i.e. a Boolean operation, string, parsable string array) and may contain a sub state variable for nesting and combining hierarchies.

Within the DES model of the present invention there can be numerous events. Events are instantaneous occurrences that change a state variable, an output, a future event or any combination thereof. Events are generated at any point at which a block within the DES model acts on an entity. Events can take numerous forms, but by example can include the creation of a new data packet in a network, the exit of a package from a loading dock or the placement of an item on a conveyor belt in a manufacturing plant. Each event within a DES model contains four specific characteristics associated with the event. Firstly, each event specifies an entity, namely a set of data associated with the event. Additionally, each event has time data associated with it, defining when the event is scheduled to occur. Events in a DES model can also have a priority associated with their execution, thereby defining the urgency of the event relative to other events that may occur at the same time. Finally, each event has a destination object associated with it, which serves to identify where the event is to take place. The destination object is typically a DES model block but can also be an entity.

Figure 7:
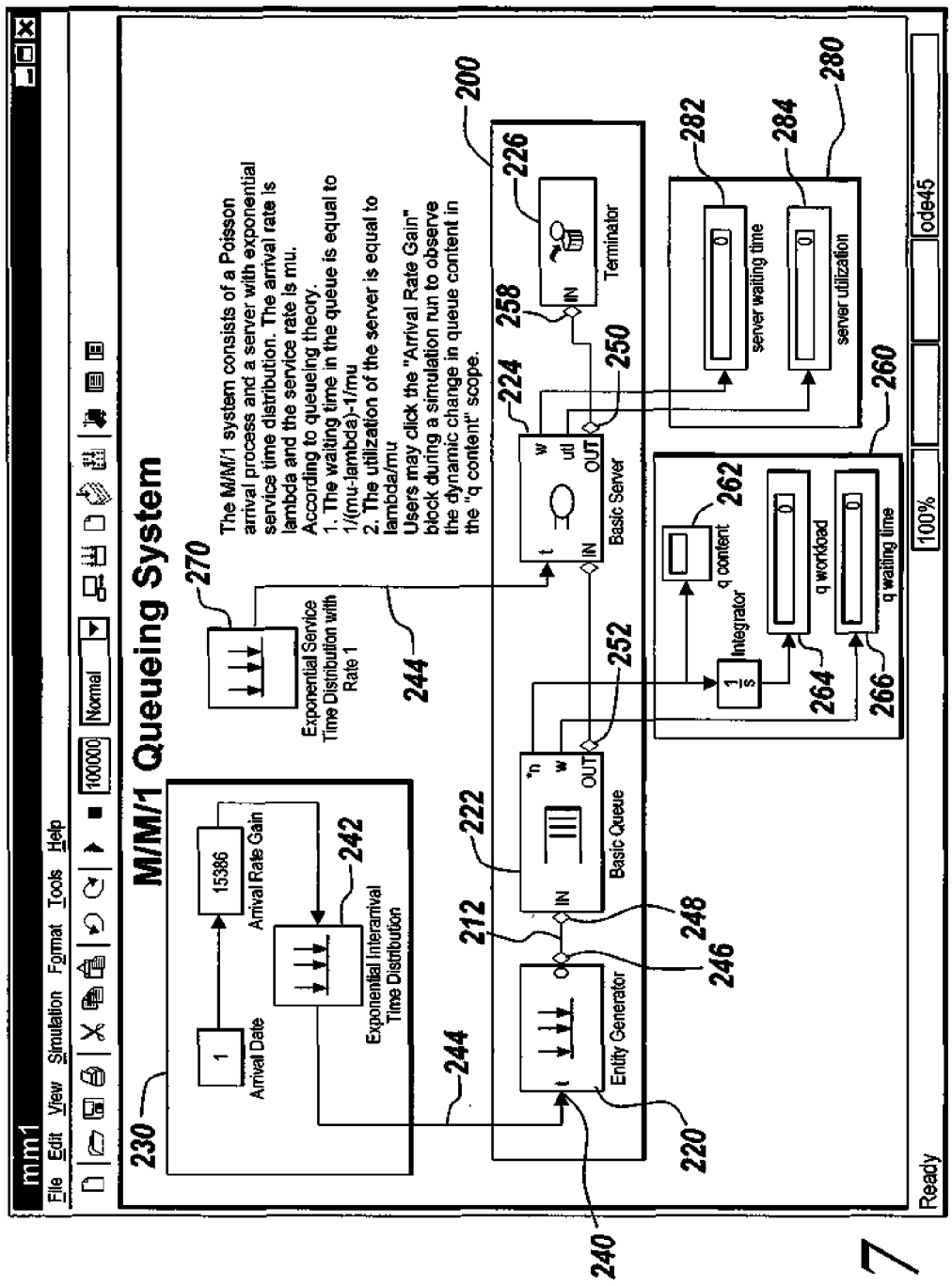
FIG. 7 is an illustrative embodiment of a Discrete event system model environment in communication with an external environment.

In FIG. 7, a DES environment 200 is denoted. The DES model is capable of communicating with external environments of various forms 230, 260, 270, 280 including such examples application as SIMULINK® and Stateflow®. In one embodiment, the DES model can receive data from these environments 230 and 270 as well as output data to these external environments 260, 280 in accordance with the needs of the user generating the model. Communication with the external environments 230, 270, 260, 280, however, is not necessary, as execution models may be created solely within DES environment that have no interface with environments beyond the DES environment 200.

An entity generator within the DES environment 220 can interface with an external environment 230, such as SIMU- LINK®, at port "t" 240 on the entity generator 220. The entity generator block 220 is an example of a source block within DES. The signal transmitted on signal path 244 and received at port "t" 240 is used to control the rate of entity generation by the entity generator 220. Associated with the signal on signal path 244 is a probability distribution provided by the Exponential Interarrival Time Distribution (SIMULINK®) subsystem 242 within the external environment 230. In light of this probability distribution, a varying signal is presented to the entity generator 220 resulting in the generation of entities in accordance with the probability distribution of the Exponential Interarrival Time Distribution a (SIMULINK®) subsystem 242. Entities generated by the entity generator 220 are passed from the output port of the entity generator 246 to the input port of the queue block 248 over the entity path 212.

The queue block 222 accepts entities and is capable of forwarding them to further associated blocks. In the present example, the entities generated by the entity generator 220 can be forwarded to the server block 224 by the queue block 222 in accordance with user defined values. For example, a user may instruct the queue to hold no more than 10 entities for forwarding. When the queue block 222 has reached capacity, the input port to the queue block 248 may be temporarily disabled thereby preventing the introduction of any more entities to the queue block 222. In such a scenario, the input port of the queue block 248 is defined as unavailable. When the number of entities within the queue block 222 has decreased below the 10 entity limit, the input port to the queue block 248 can be made available, allowing the delivery of additional entities from the entity generator 220 to the queue block 222. Entities within the queue block 222 can be queued based upon the time at which they were generated by the entity generator 220, or can be queued based upon numerous other arrangements. For example, a priority may be associated with various entities, and the queue block 222 may queue entities based upon their priority. Furthermore, as exhibited in FIG. 7, the queue block 222 may interface with an external environment 260 outside of the DES model 200. As illustrated, the queue block 222 has been associated with a scope 262, a first display 264 and a second display 266, thereby allowing a user to graphically view that which is occurring within the queue block 222.

The queue block 222 of the illustrative embodiment can pass entities from the output port of the queue block 252 to an input port 254 of the associated server block 224. The server block 224 can accept entities delivered through the entity path 212 connecting the queue block output 252 to the Server Block input port 254. The Server Block 224 can delay a received entity for a time before passing it to the next associated block, namely the Terminator Block 226. The delay associated with a server is known as a "service time". Service time may be user-defined, or may be based upon an internally or externally generated value. For example, the example embodiment utilizes a SIMULINK® signal with an associated probability distribution in the Exponential Service Time Distribution with Rate 1 block 270. This results in a variable service time for the server block 224. This variable service time is provided to the Server Block 224 at port 272 of the server block via a signal line 244. While the server block 224 is busy, i.e. during the service time, the server block 224 will make its input port 254 unavailable, thereby preventing the reception of any additional entities. Upon expiration of the service time, the input port to the server block 254 will be made available, thereby allowing the passage of entities once again. Simultaneously, once the service time is completed, the server can pass entities from an output port of the server block 250 to a further associated block. In the present example, this block is a terminator block 226, which is a sink within the DES environment. The terminator block 226 can be user-defined to accept all entities passed to it, or may have other functionality defined by a user. For example, the terminator block 226 may be defined such that it blocks all entities delivered to it, or may produce an error message upon the arriving of an entity. The server block 224 of the illustrated embodiment can further be associated with an external environment 280 external to the DES model. As evidence in the example, the server block 224 can deliver a signal to a first graphical interface 282 and a second graphical interface 284 so that a user can monitor the internal operations of the Server block 224.

In a DES model environment, the DES solver is driven by ordered events, therefore time becomes a secondary variable in the execution. The order of events within a DES model is continually updated in response to changes in the model. Utilizing such an event-driven model, only those points at which an event is scheduled to occur need to be modeled. Time between events, namely "empty time" need not be modeled, thereby resulting in improved efficiency and decreased processor demand.

Events within a DES model are scheduled and managed using an Event Calendar. Unlike a time-based modeling environment, size of the time interval between events is simply the period of time between events. Using the Event Calendar, the DES model can determine when to update the states of certain block in the model, and can also infer when to save time by not updating states. An example of the application of the Event Calendar is best seen by example.

FIG. 8 is an example DES model for use in describing the Event calendar. Assume that the blocks are configured so that the Entity Generator 300 block generates an entity at various times, namely t=0.9 seconds, 1.7 seconds, 3.8 seconds, 3.9 seconds, 6 seconds. Further assume that the queue block 302 has a capacity of 20. Additionally, assume that the server block 304 uses random service times that are uniformly distributed between 0.5 seconds and 2.5 seconds. When the execution first starts, the queue block 302 and server block 304 are empty. The entity generator block schedules a first event at t=0.9 s. An illustrative example of the event calendar 900 at time t=0.9 is illustrated in FIG. 9. One skilled in the art will recognize that the described parameters are merely illustrative of one example, and that the model can generate any suitable number of entities at any suitable time, the queue block can have any suitable capacity and the server block can have any suitable service time.

At t=0.9 seconds, the entity generator block 300 of FIG. 8 creates an entity and attempts to output the entity from the entity generator output 346. Because the queue block 302 is empty, the entity advances from the entity generator block output 346 to the queue block input 348 over the entity path 312 in the model. Since the queue block 302 has no entity within it, the queue block 302 attempts to output the entity to the next block in the model, namely the server block 304. Because the server block 304 is empty, the entity advances from the queue block 302 to the server block 304. At this moment, the server's entity input port 354 is temporarily unavailable to future entities.

Upon receiving the entity, the server block 304 schedules an event that indicates when the entity's service time is completed. For the purpose of illustration, duration of service of 1.3 seconds is assumed. In light of this, service will be completed at a time of t=2.2 seconds, the sum of the time that the entity enters the server, and the service time.

As set forth previously, a second entity generation event is scheduled at t=1.7 seconds. The event calendar and the associated DES model 903 at a time of t=1.7 seconds is depicted in FIG. 10. The updated Event Calendar 902 is shown, as well as a graphical representation of entity status within the DES model. In FIG. 10, the element marked "e1" 404 signifies the first entity and the dashed arrow 906 serves to indicate the advancement of the first entity 404 from the entity generator block 300 to the queue block 302 and finally to the server block 304.

As evidenced in the Event Calendar at time t=1.7 seconds 902 of FIG. 10, a second entity is to be generated at a time of t=1.7 seconds.

FIG. 11 is an illustrative embodiment of the present invention at a time of t=1.7 seconds 904. At a time of t=1.7 seconds the entity generator block 300 will create an entity "e2" 504 and will attempt to output it. The queue block 302 is empty at this point in time, so the second entity 504 advances from the entity generator 300 to the queue 302 as illustrated in FIG. 11. The advance of the second entity 504 is depicted by the dashed arrow 506.

As depicted in FIG. 11, the newly generated entity "e2" 504 is the only one in the queue block 302. The queue block 302 will therefore attempt to output the second entity 504 to the server block 304. As entity e1 404 remains in the server block 304, the server block's input port 354 is unavailable to receive the second entity 504. The second entity 504 will therefore remain in the queue block 302 until the server becomes available.

FIG. 12 is an illustrative example of the event calendar at a time of t=2.2 seconds 905. Based upon the original assumptions, the entity generator block will schedule the generation of a third entity (e3) at a time of t=3.8 seconds.

FIG. 13 is an illustrative embodiment of the present invention at a time of t=2.2 seconds 906. At t=2.2 seconds, the server block 304 finishes serving the first entity 404 (i.e. service time is completed) and attempts to output the first entity 404 to the associated terminator block 306. The terminator block 306 is simply a sink that by definition accepts and absorbs all entities. In light of this, the first entity (e1) 404 advances from the server block 304 output port 356 to the terminator block 306 input port 358. As the first entity (e1) 404 advances, the server block's 304 entity input port 354 becomes available once again, allowing the queue block 302 to pass the second entity (e2) 504 to the server block 304 via the server block input port 354 via an entity path 212. Upon passing the second entity 504 to the server block 304, the queue block 302 is now empty and the server block 304 becomes busy again. As the server block 304 is busy, the server block's entity input port 354 becomes temporarily unavailable once again.

Figures 14, 15, 16:
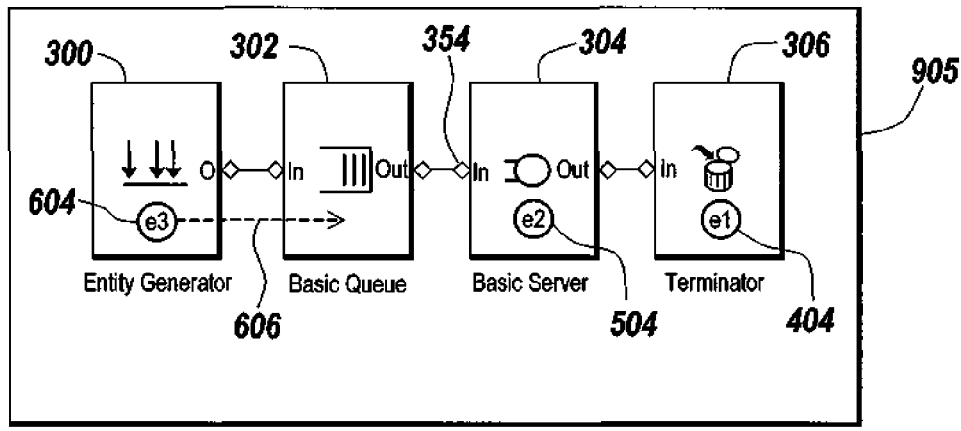
FIG. 14 is an illustrative embodiment of the event calendar and system model of the present invention.
FIG. 15 is an illustrative embodiment of a Discrete event system model environment.
FIG. 16 is an illustrative embodiment of the event calendar and system model of the present invention.

FIG. 14 is a depiction of the Event Calendar at a time of t=3.8 seconds 904. The event calendar at time t=3.8 seconds has been generated using the assumption that a service time of t=2.0 seconds has been established for the second entity.

FIG. 15 is a graphical depiction of the DES model at a time of t=3.8 seconds 905. At t=3.8 seconds, a third entity 604 will be generated by the entity generator block 300. The queue block 302 remains empty, so the third entity 604 advances from the entity generator 300 to the queue block 302. The advancement of the third entity 604 from the entity generator 300 to the queue block 302 is illustrated by the dashed line 606.

Because the third entity 604 is the only one in the queue block 302, the queue block 302 will attempt to output the entity to the server block 304. As set forth above, the server block's input port 354 remains unavailable due to the presence of the second entity 504 in the server block 304, so the third entity 604 will remain in the queue block 302. The queue block's 302 entity output port 352 is said to be blocked because an entity has tried and failed to depart via this port.

FIG. 16 graphically represents the event calendar at a time of t=3.9 seconds 906.

Figure 17:
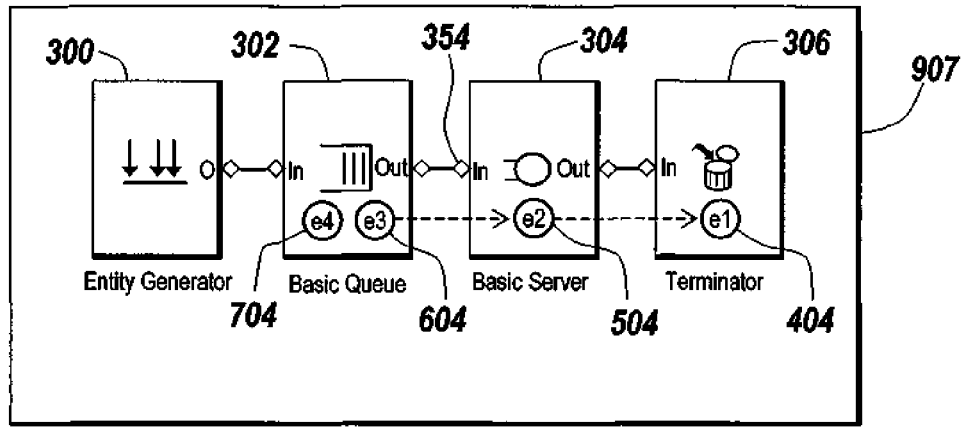
FIG. 17 is an illustrative embodiment of a Discrete event system model environment.

FIG. 17 is a graphical depiction of the present invention at a time of t=3.9 seconds 907. At t=3.9 seconds, the entity generator 300 schedules the generation of a fourth entity 704. The entity generator 300 will attempt to output the fourth entity 704 to the queue block 302. Since the queue block 302 is not full, the fourth entity 704 will advance from the entity generator block 300 to the queue block 302. The server block's entity input port 354 remains unavailable, therefore the queue block 302 cannot output the fourth entity 704 to the server block 304. The queue length within the Queue Block 302 is two, as depicted in FIG. 17.

Figure 18:
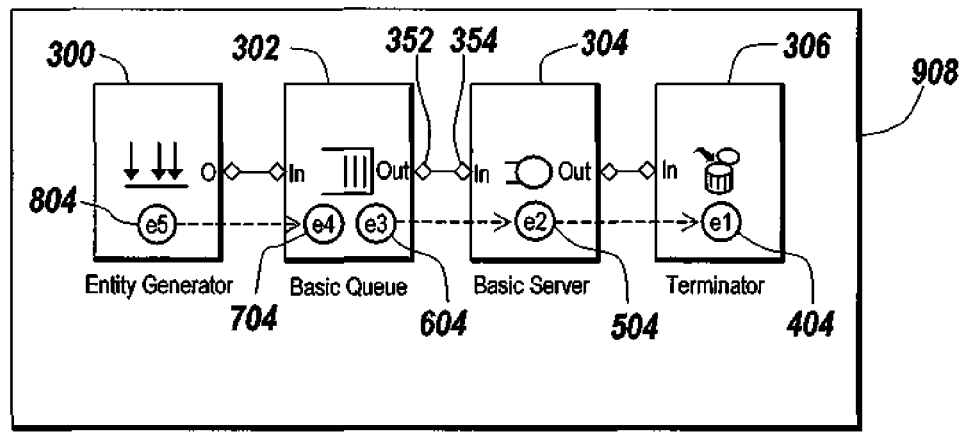
FIG. 18 is an illustrative embodiment of the event calendar and system model of the present invention.

FIG. 18 is a graphical depiction of the DES model 908 and event calendar 909 at a time of t=4.2 seconds. At t=6.0 seconds, a fifth entity 804 is generated by the entity generator 300. At time t=4.2 the server block 304 finishes serving the second entity 504 and attempts to output the second entity 504 to the terminator block 306. The terminator block 306 accepts the second entity 504 and the second entity 504 advances from the server block 304 to the terminator block 306 via a entity path 212. Additionally, the server block's entity input port 354 becomes available, so the queue block's entity output port 352 becomes unblocked. The queue block 302 is now able to output the third entity 604 to the server block 304. The queue length within the queue block 302 has decreased to only one entity, namely the fourth entity 704, and the server block 304 once again becomes busy. The server block's entity input port 354 again becomes temporarily unavailable. The server block 304 will schedule an event on the event calendar that indicates when the entity's service time is completed on the event calendar. For illustrative purposes, 0.7 seconds will be used. The event calendar at a time of t=4.9 seconds 909 is presented in FIG. 19.

The queue block 302 will attempt to output the fourth entity 704, but the server block's entity input port 354 is unavailable. In light of this, the fourth entity 704 remains in the queue block 302. At the same instant, the queue block's entity output port 352 becomes blocked, prohibiting further attempt to pass the fourth entity 704 to the server block 304 while the server block's input port 354 remains blocked.

Remaining entities within the illustrated model will pass through the model in accordance with the above steps as driven by the event calendar. Additional entities may be placed on the calendar by the entity generator block 300, or no additional entities may be generated and the execution will be complete upon the passage of the fifth entity 804 to the terminator block.

The defined times on the event calendar are inherently important within the DES modeling systems, as events on the event calendar serve as indicators of times at which the systems state is changing. In contrast, times between events on the event calendar are not important to modeling the system, in that at these times the system state remains unchanged. In light of this, the DES modeler skips the static periods and focus on the event times of the event calendar. Such an arrangement offers increased efficiency as compared to a fixed sampling interval.

Additionally, at defined times within the event calendar, multiple states can change instantaneously. For example, at time t=2.2, the server block 304 becomes idle and then busy again. Simultaneously, the queue length also changes because the queue block 302 outputs a second entity (e2) 504 to the server block 304.

The illustrative event calendar serves as a convenient example of event processing at discrete time intervals within the model. Inherent in advanced modeling of a system, however, is an occurrence of two or more events that are scheduled to occur at the same time instant. Such events are defined as "simultaneous" events and are depicted on a sample event calendar in FIG. 20. The sequential processing of these simultaneous events may be irrelevant or relevant to the execution results, therefore the DES modeler contains numerous methods for determining the proper processing sequence. One such method is the assignment of priority levels to the events.

In FIG. 21, priority values 1 and 2 are respectively assigned to the first and second events within the event calendar, which are simultaneous, as the time of event for both is t=2.1 seconds. The relative priorities among the simultaneous events therefore determine their processing sequence within the event calendar. Using a priority value associated with simultaneous events allows a user to decide how various events are related to each other. However, this approach might be inappropriate if a deterministic approach produces a bias that inaccurately reflects the phenomena that a user is modeling. In light of such concerns, a random sequence may be utilized. The random sequence for executing simultaneous events offers the advantage of eliminating bias in the execution, but results in the non-repeatability of the execution should a user run the execution more than once, assuming random number seeds are not utilized.

The DES model of the present invention allows for the transfer of information to various block within the DES model environment, as well as to environments outside of the DES model. For example, as indicated in FIG. 7, the use of a terminator block as a sink may allow for acceptance of all entities within the model. In place of or in conjunction with the terminator block, a scope block may be utilized to accept an entity and plot data from an attribute of the entity. Data plotted may include a plot of information related to entities experiencing a discrete event or a discrete state. Utilizing a scope block a user can visually verify the operation and performance of a DES model. Additionally, a display block may be associated with the DES model such that the value of an attribute of an entity is graphically displayed. The DES model of the present invention further includes blocks that allow the export of entity attribute values to regions outside of the DES model environment. For example, individual entity priority data may be exported to an external modeling environment such as SIMULINK®. Control of export of data from this block can take place within the DES model environment, can be controlled by an external environment, or can be a combination of both. In light of this, when modeling complex systems, the DES model of the present invention can be incorporated into other modeling, execution, and display applications. In the alternative, the DES model of the present invention can operate in a standalone configuration, wherein a system to be modeled is modeled solely within the DES model environment.

Figure 22:
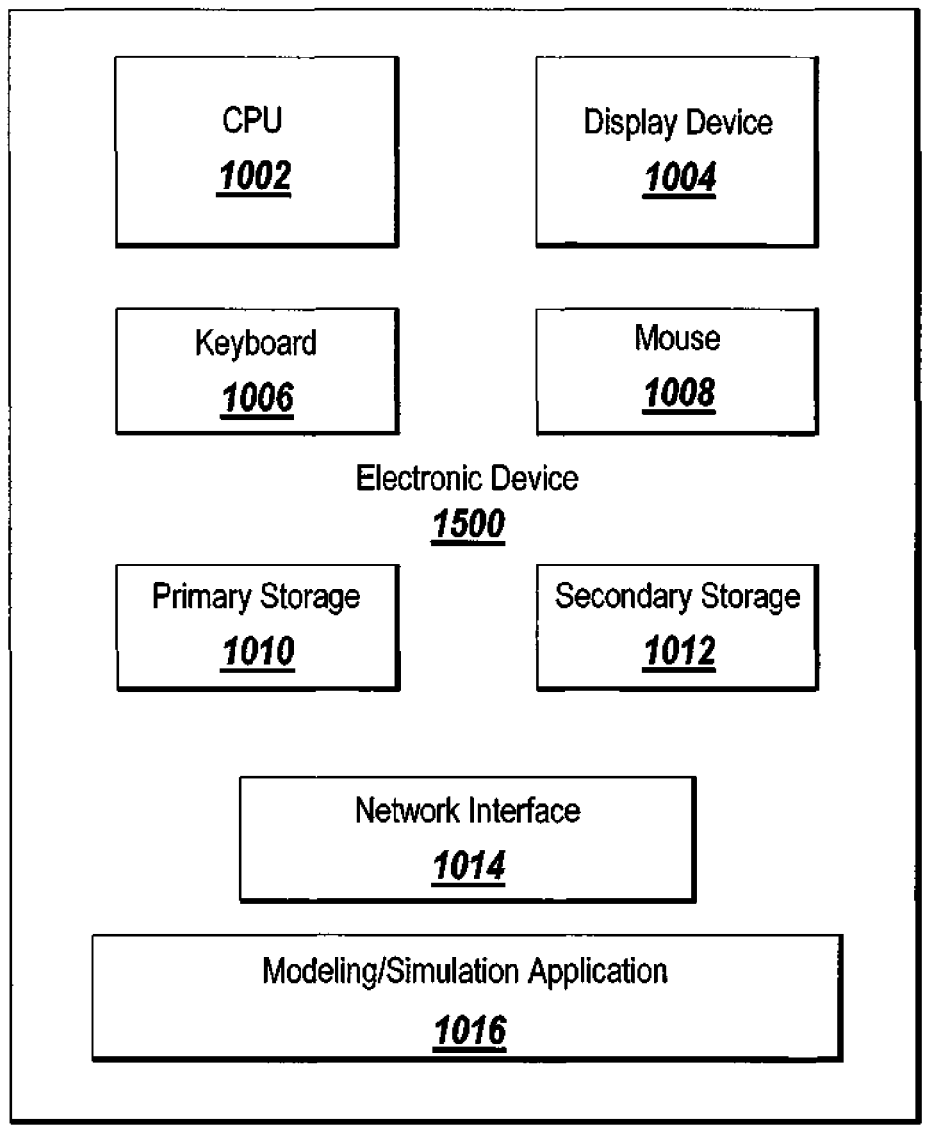
FIG. 22 is a block diagram illustration of an electronic device suitable for implementation of aspects of the present invention.

FIG. 22 illustrates one example embodiment of an electronic device 1500 suitable for practicing the illustrative embodiments of the present invention. The electronic device 1500 is representative of a number of different technologies, such as personal computers (PCs), laptop computers, workstations, personal digital assistants (PDAs), Internet appliances, cellular telephones, and the like. In the illustrated embodiment, the electronic device 1500 includes a central processing unit (CPU) 1002 and a display device 1004. The display device 1004 enables the electronic device 1500 to communicate directly with a user through a visual display. The electronic device 1500 further includes a keyboard 1006 and a mouse 1008. Other potential input devices not depicted include a stylus, trackball, joystick, touch pad, touch screen, and the like. The electronic device 1500 includes primary storage 1010 and secondary storage 1012 for storing data and instructions. The storage devices 1010 and 1012 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 1010 and 1012. The electronic device 1500 can also include a network interface 1014 for communicating with one or more electronic devices external to the electronic device 1500 depicted. A modem is one form of network interface 1014 for establishing a connection with an external electronic device or network. The CPU 1002 has either internally, or externally, attached thereto one or more of the aforementioned components. In addition to applications previously mentioned, modeling applications 1016, can be installed and operated on the electronic device 1500.

It should be noted that the electronic device 1500 is merely representative of a structure for implementing the present invention. However, one of ordinary skill in the art will appreciate that the present invention is not limited to implementation on only the described device 1500. Other implementations can be utilized, including an implementation based partially or entirely in embedded code, where no user inputs or display devices are necessary. Rather, a processor can communicate directly with another processor or other device.

Figure 23:
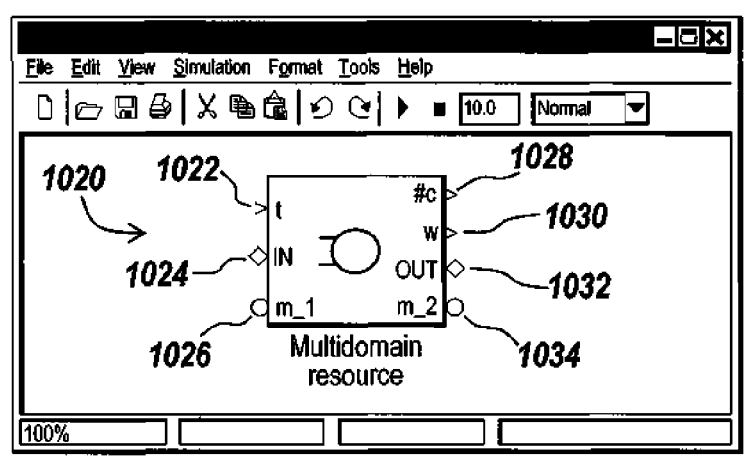
FIG. 23 is a screen depiction of a block within a block diagram model, according to one aspect of the present invention.

FIG. 23 is a diagrammatic illustration of a block 1020, in accordance with one embodiment of the present invention. The block in this example embodiment is a block operating in the DES environment. The block 1020 includes a first input port 1022, a second input port 1024, and a third input port 1026. The block 1020 further includes a first output port 1028, a second output port 1030, a third output port 1032, and a fourth output port 1034.

In general, an input port can be available or unavailable, depending upon conditions occurring during a model execution and also depending upon the type of data the input port handles. In the DES environment, an available input port can accept entities, while an unavailable input port turns away entities. An output port can be blocked or not blocked, depending upon conditions occurring during a model execution and also upon the type of data the output port handles. In the DES environment, a blocked output port will prevent an entity from leaving the block through the blocked port. A port that is not blocked will allow an entity to pass through the port, if attempted. Each of the input and output ports are discussed in further detail below.

In the example embodiment, the first input port 1022 is marked with a ">" symbol, which represents an input port that handles data from a time-based model execution environment, such as that of SIMULINK®. The first input port 1022 can therefore handle data having continuous-time-driven or discrete-time-driven semantics. The corresponding output ports (the first output port 1028 and the second output port 1030) likewise have a ">" symbol, and thus indicate output ports that handle data from a time-based model execution environment, such as that of SIMULINK®.

The second input port 1024 is marked with a "◊" symbol, which represents an input port that handles data from a DES environment. The second input port 1024 is therefore an entity input port and can handle the arrival of entities. The entity input port 1024 is only in active use at zero or more discrete times at which an entity passes through the port during the model execution. The corresponding output port, third output port 1032, likewise has a "◊" symbol, and thus indicates an entity output port. The entity output port 1032 is also only in active use at zero or more discrete times at which an entity is passing through the port during model execution.

The third input port 1026 is marked with a "o" symbol, which represents an input port that handles kinematic constraints from a mechanical model execution environment. The third input port 1026 is therefore a constraint input port and can handle the arrival of kinematic constraints. The third input port 1026 is active when kinematic constraints are indicated. The corresponding output port, fourth output port 1034, likewise has a "o" symbol, and thus indicates a constraint output port. The constraint output port 1034 is also only in active use when constraints are passed through the port.

It should be noted that the specific symbols discussed herein are merely examples of possible symbols that can be used to represent different ports. The present invention is not limited to the specific symbols shown and the particular type of port said to correlate with those symbols. Rather, it is intended that a symbol of some form can be defined in a DES environment to be used in a graphical representation of that environment to indicate a selected type of port that communicates with a selected environment. The specific correlation of symbol and port type can be determined upon creation of the application supporting the DES environment, or can be determined at a later point in time, such as by the user during creation of the model. Accordingly, the present invention is not limited to the specific symbols illustrated herein, or the specific correlations to the symbols as described.

Furthermore, it should be noted that the block 1020 of FIG. 23 indicates the intake and output of data, entities, and constraints from three different environments. The different ports (1022, 1024, 1026, 1028, 1030, 1032, and 1034) are illustrative of the capability of the present invention to enable a block in the DES environment to operate in conjunction with a multiplicity of data types. Furthermore, as mentioned herein, the present invention is not limited to the domains and environments specified in the example embodiments. Rather, the domains and environments are used to demonstrate the variety of different modeling domains that can be a part of a block, and are merely a subset of environments and domains that can work in accordance with the present invention.

It should further be noted that any number of different types of ports can be added to the block. For example, FIG. 23 show the block 1020 with ports from three different domains. The block 1020 can have additional ports added on both the input and output sides of the block 1020, or can have fewer ports. Accordingly, blocks within the DES environment can be configured to have the desired number of input and output ports.

Figure 24:
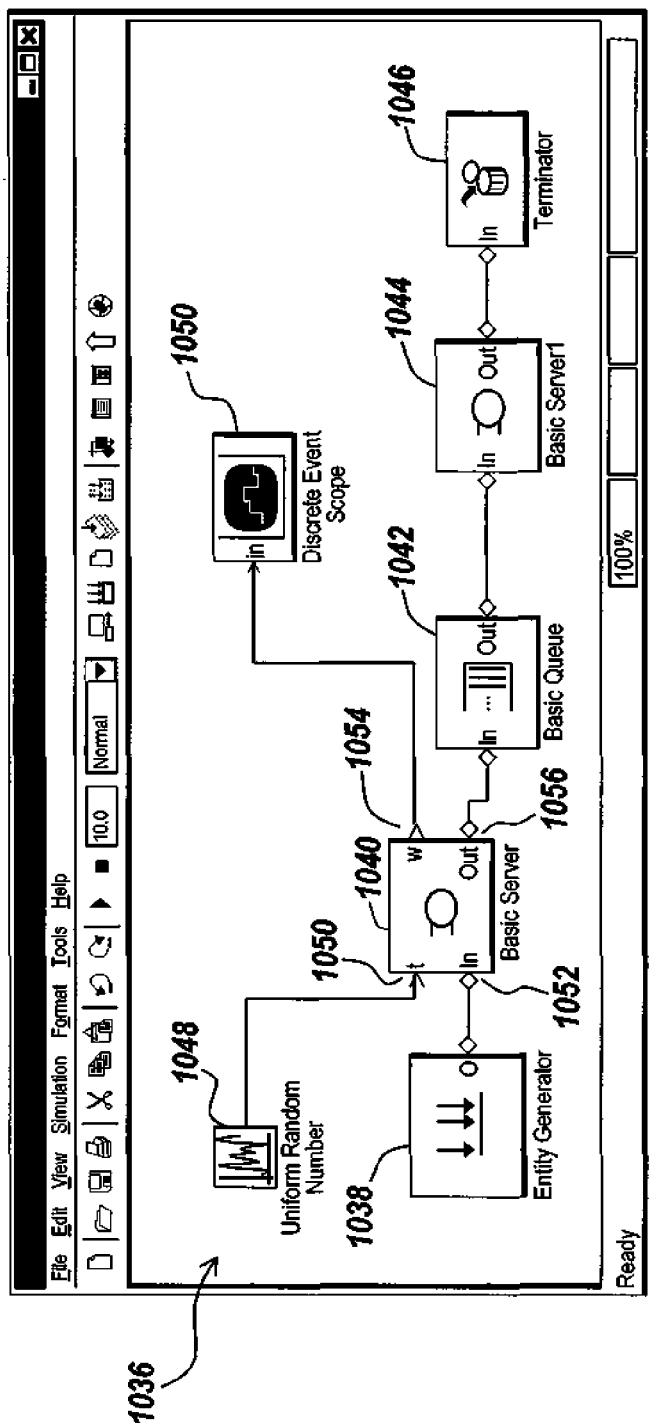
FIG. 24 is a screen depiction of a block diagram model, according to one aspect of the present invention.

FIG. 24 is a diagrammatic illustration of another DES model 1036. In this instance, the DES model 1036 includes an entity generator 1038, which generates entities and passes them to a first server 1040. The first server 1040 passes entities to a queue 1042, which in turn passes entities to a second server 1044. Upon exiting the second server 1044, entities are passed to a terminator 1046.

The first server 1040 has a first input port 1050 and a second input port 1052, as well as a first output port 1054 and a second output port 1056. The first input port 1050 and the first output port 1054 are represented by the ">" symbol, which in this embodiment indicates a time-based signal. The second input port 1052 and the second output port 1056 are represented by the "◊" symbol, which in this embodiment indicates an event-based entity passes through the port.

The first input port 1050 receives the time-based signal from a random number generator 1048. The second input port 1052 receives entities from the entity generator 1038. The first output port 1054 sends a time-based signal to a scope 1050. The second output port sends entities to the queue 1042.

In accordance with the present invention, the first server 1040 maintains ports from two different environments, namely, the DES environment and the time-based model or simulation environment. The different environments are graphically represented by the different symbols used to indicate the ports.

Figure 25A:
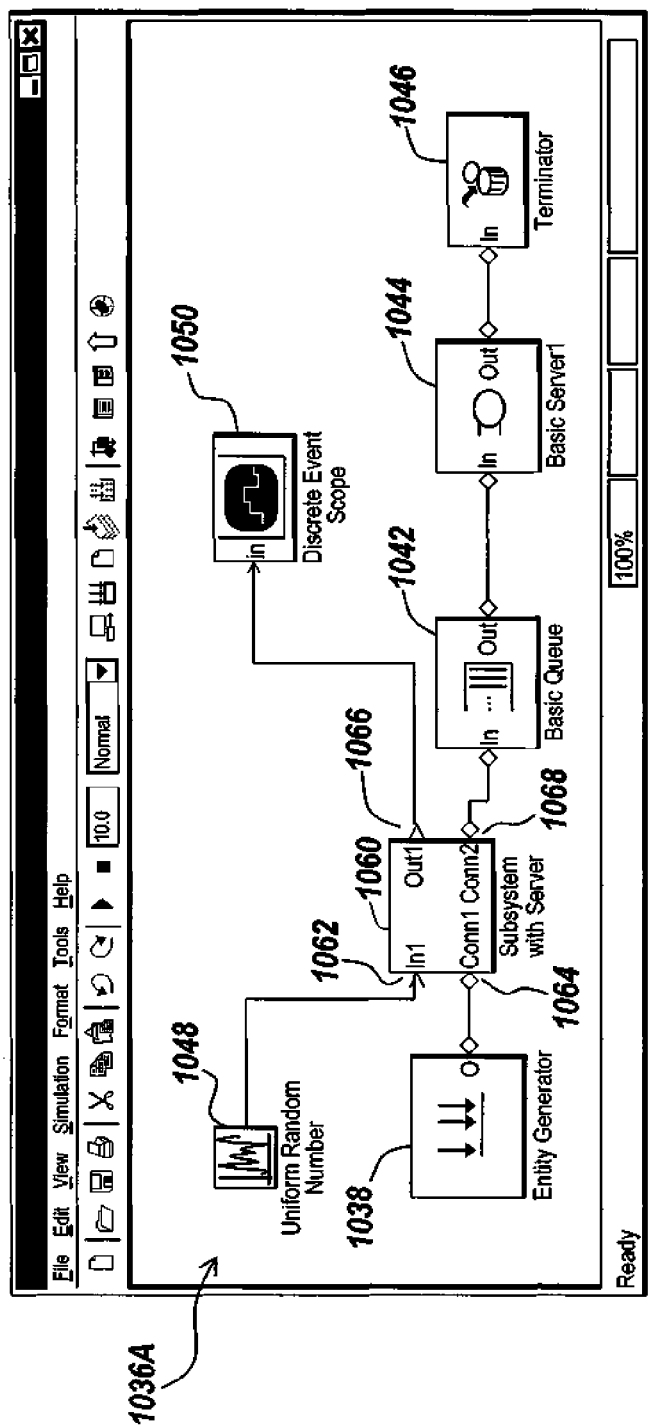
FIG. 25A is a screen depiction of a modified version of the block diagram of FIG. 24, according to one aspect of the present invention.

FIG. 25A is a diagrammatic illustration of a variation of the DES model 1036 of FIG. 24, namely DES model 1036A. In this instance, the DES model 1036A includes the entity generator 1038, which generates entities and passes them to a first subsystem 1060. The first subsystem 1060 passes entities to the queue 1042, which in turn passes entities to the second server 1044. Upon exiting the second server 1044, entities are passed to the terminator 1046.

The first subsystem 1060 has a first input port 1062 and a second input port 1064, as well as a first output port 1066 and a second output port 1068. The first input port 1062 and the first output port 1066 are represented by the ">" symbol, which in this embodiment indicates a time-based signal. The second input port 1064 and the second output port 1068 are represented by the "◊" symbol, which in this embodiment indicates an event-based entity passes through the port.

The first input port 1062 receives the time-based signal from the random number generator 1048. The second input port 1064 receives entities from the entity generator 1038. The first output port 1066 sends a time-based signal to the scope 1050. The second output port sends entities to the queue 1042.

The ports of the first subsystem 1060 communicate with the ports of the first server 1040. Thus, the first input port 1062 conveys a signal to the first input port 1050 of the first server 1040. The second input port 1064 conveys entities to the second input port 1052 of the first server 1040. Likewise the first and second output ports 1066 and 1068 of the first subsystem 1060 communicate with the first and second output ports 1054 and 1056 of the first server 1040.

Figure 25B:
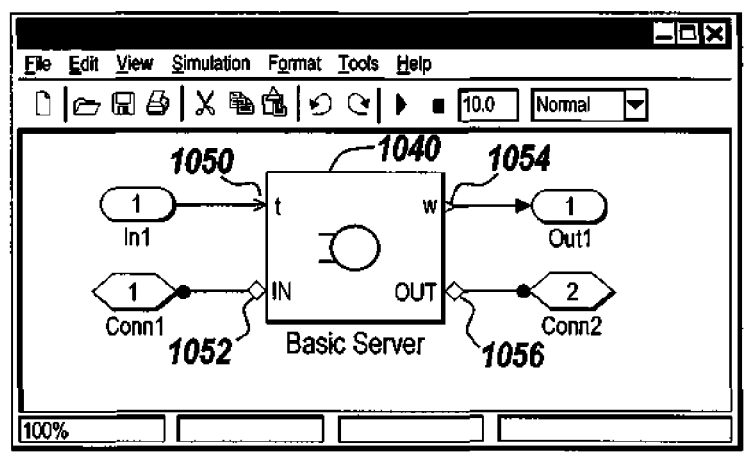
FIG. 25B is a screen depiction of a subsystem of the block diagram of FIG. 25A according to one aspect of the present invention.

Accordingly, the primary difference between the DES model 1036 of FIG. 24 and the DES model 1036A of FIG. 25A is that instead of the server 1040 being located in the DES model at the level displayed, the server 1040 has been replaced with the subsystem 1060. As depicted in FIG. 25B, the subsystem 1060 has contained within it the server 1040, with its corresponding input and output ports. Thus, in FIG. 25A, the server 1040 is operating at sub-level within the subsystem 1060 depicted. This illustrates the ability of the present invention to make use of the port symbols at different hierarchical levels within the DES model to indicate communications with different environments from the same DES model.

The type of symbol used can be determined differently based on different implementations of the present invention.

For example, working within a product line from a single model execution application provider, a convention can exist for which symbols are utilized to represent which environments. Thus, when a user creates a block, the port symbols can be predetermined by the software model execution application. Alternatively, the model execution application can randomly generate the symbols for a particular model, or can give the user the option to set the symbol correlations to the different environments to indicate ports of multiple different types.

It should further be noted that the symbols for each of the ports, indicating multiple different types of ports, are also indicative of an underlying operation occurring within the DES environment. In order to enable the use of ports of multiple different types that can handle the different types of data and information discussed herein and available during model executions, there must be an underlying functionality that converts or translates the different environment information into and out of the DES environment.

More specifically, the present invention illustrates at a top level the functionality of an underlying method and system for transferring data between the DES environment and other environments distinct from the DES environment. The hybrid combination of both the DES model as well as an alternative environment that is not a DES system offers a user the ability to analyze a dynamic system with the most appropriate tools necessary for the executable model evaluation, as opposed to being restricted by the constraints of a single model environment. The functionality that implements the conversion or translation can be in the form of a block that automatically handles the conversion or translation. For example, the block can take a time-based signal and convert it to an entity-based format. The block can take a mechanical constraint and convert it to an entity-based format. The block can likewise take entity information and convert it to time-based signals. One of ordinary skill in the art will appreciate that the types of conversion are not limited to those described herein. Rather, all combinations of conversion or translation between different environments are anticipated to be handled by the conversion or translation blocks. Accordingly, the symbolic representations of the ports for the blocks in the DES environment can be configured to correlate to each of the different environments being handled by the model execution to represent the underlying conversions or translations.

The capability for the blocks and subsystems to contain ports of multiple types, each from environments having different icons, and representing a set of semantics from different domains or environments, enables the semantics of each environment to be independent of the graphical hierarchy. It allows each environment to conceptually connect the semantics of any given atomic component, such as a block, to any other, without the constraints of graphical hierarchy. This allows, for example, the transmission of a car to be graphically depicted in a subsystem and the engine to be depicted in another subsystem. Additionally, it allows such models to have multiple connections between the subsystems to indicate the analog electrical, digital electrical, event-based, mechanical, wireless radio frequency, or other interfaces used to communicate.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the disclosed invention is reserved.

What is claimed is:

1. A non-transitory computer-readable medium storing instructions for modeling a dynamic system, the instructions comprising:
   one or more instructions which, when executed by a processor, cause the processor to:
      provide a non discrete event system (non-DES) environment associated with a non-DES entity in the dynamic system;
      provide an executable model having a multidomain resource present in a discrete event system (DES) environment in the dynamic system, wherein the DES environment schedules when events occur, the multidomain resource comprising:
         a first input port indicated by a first symbol, in a graphical representation of the executable model, representing a port domain type of the DES environment,
            the first input port connected to a first part of the executable model, the first part of the executable model being separate from the multidomain resource, and
         a second input port indicated by a second symbol, in the graphical representation of the executable model, representing a port domain type of the non-DES environment,
            the second input port connected to a second part of the executable model, the second part of the executable model being separate from the multidomain resource, and
            the first symbol, which identifies the first input port as the port domain type of the DES environment, being different than the second symbol, which identifies the second input port as the port domain type of the non-DES environment, and
            the second input port enabling the multidomain resource in the DES environment to graphically connect the non-DES environment to the DES environment and to operate in conjunction with a data type associated with the non-DES environment;
      execute the executable model to analyze the dynamic system, where the instructions, when executing the executable model, cause the processor to:
         convert the non-DES entity into a format compatible with the DES environment;
         receive a DES entity at the first input port of the multidomain resource, wherein the DES entity is an event based entity;
         receive the non-DES entity at the second input port of the multidomain resource; and
         manipulate the non-DES entity and the DES entity with the multidomain resource.

2. The non-transitory computer-readable medium of claim 1, wherein the graphical representation of the executable model comprises a DES block diagram.

3. The non-transitory computer-readable medium of claim 1, wherein the multidomain resource comprises a queue block or a server block.

4. The non-transitory computer-readable medium of claim 1, wherein the non-DES environment comprises one of:
- a continuous time-based model execution environment,
- a discrete time-based model execution environment,
- a dataflow environment, or
- a state-based model execution environment.

5. The non-transitory computer-readable medium of claim 1, wherein the multidomain resource is configured within a hierarchically configured model.

6. The non-transitory computer-readable medium of claim 1, wherein the multidomain resource is configured within a subsystem of the executable model.

7. The non-transitory computer-readable medium of claim 1, wherein the port domain type of the DES environment or the non-DES environment comprises at least one of:
- an input trigger-callable port,
- an input function-callable port, or
- an input enabled port.

8. The non-transitory computer-readable medium of claim 7, wherein the port domain type of the DES environment or the non-DES environment is identifiable by the first symbol or the second symbol.

9. The non-transitory computer-readable medium of claim 1, wherein the non-DES entity is a variable service time or a time based signal received from a random number generator.

10. The non-transitory computer-readable medium of claim 1, wherein:
- the multidomain resource further comprises a third port;
- the third port is an output port domain type of the non-DES environment; and
- the multidomain resource transmits a non-DES signal through the third port to a non-DES block.

11. The non-transitory computer-readable medium of claim 10, wherein the non-DES block represents a scope or a graphical interface.

12. The non-transitory computer-readable medium of claim 1, wherein the instructions, when executing the executable model, cause the processor to:
- transfer the non-DES entity received at the second input port to an output port of the multidomain resource that connects to a third part of the executable model in the DES environment.

13. The non-transitory computer-readable medium of claim 1, wherein the port domain type of the non-DES environment corresponds to at least one of
- a continuous time-based model execution environment,
- a discrete time-based model execution environment,
- a kinematic constraint-based model execution environment,
- a dataflow environment, or
- a state-based model execution environment.

14. A method of modeling a dynamic system, the method comprising:
- providing a non discrete event system (non-DES) environment associated with a non-DES entity in the dynamic system,
  - the providing the non-DES system environment being performed by a device;
- providing an executable model having a multidomain resource present in a discrete event system (DES) environment in the dynamic system, wherein the DES environment schedules when events occur, the multidomain resource comprising:
  - a first input port indicated by a first symbol, in a graphical representation of the executable model, representing a port domain type of the DES environment,
    - the first input port connected to a first part of the executable model, the first part of the executable model being separate from the multidomain resource, and
  - a second input port indicated by a second symbol, in the graphical representation of the executable model, representing a port domain type of the non-DES environment,
    - the second input port connected to a second part of the executable model, the second part of the executable model being separate from the multidomain resource,
    - the first symbol, which identifies the first input port as the port domain type of the DES environment, being different than the second symbol, which identifies the second input port as the port domain type of the non-DES environment, and
    - the second input port enabling the multidomain resource in the DES environment to graphically connect the non-DES environment to the DES environment and to operate in conjunction with a data type associated with the non-DES environment; and
  - the providing the executable model being performed by the device;
- executing the executable model to analyze the dynamic system, where executing the executable model includes:
  - converting the non-DES entity into a format compatible with the DES environment;
  - receiving a DES entity at the first input port of the multidomain resource, wherein the DES entity is an event based entity;
  - receiving the non-DES entity at the second input port of the multidomain resource; and
  - manipulating the non-DES entity and the DES entity with the multidomain resource,
  - the executing being performed by the device.

15. The method of claim 14, wherein the graphical representation of the executable model comprises a DES block diagram.

16. The method of claim 14, wherein the multidomain resource comprises a queue block or a server block.

17. The method of claim 14, wherein the non-DES environment comprises one of:
- a continuous time-based model execution environment,
- a discrete time-based model execution environment,
- a dataflow environment, or
- a state-based model execution environment.

18. The method of claim 14, wherein the multidomain resource is configured within a hierarchically configured model.

19. The method of claim 14, wherein the multidomain resource is configured within a subsystem of the executable model.

20. The method of claim 14, wherein the port domain type of the DES environment or the non-DES environment comprises at least one of:
- an input trigger-callable port,
- an input function-callable port, or
- an input enabled port.

21. The method of claim 20, wherein the port domain type of the DES environment or the non-DES environment is identifiable by the first symbol or the second symbol.

22. The method of claim 14, wherein the port domain type of the non-DES environment corresponds to at least one of
a continuous time-based model execution environment,
a discrete time-based model execution environment,
a kinematic constraint-based model execution environment,
a dataflow environment, or
a state-based model execution environment.

23. A device comprising:
a memory to:
store an executable model having a multidomain resource present in a discrete event system (DES) environment, wherein the DES environment schedules when events occur, the multidomain resource comprising:
a first input port indicated by a first symbol, in a graphical representation of the executable model, representing a port domain type of the DES environment,
the first input port connected to a first part of the executable model, the first part of the executable model being separate from the multidomain resource, and
a second input port indicated by a second symbol, in the graphical representation of the executable model, representing a port domain type of a non discrete event system (non-DES) environment,
the second input port connected to a second part of the executable model, the second part of the executable model being separate from the multidomain resource,
the first symbol, which identifies the first input port as the port domain type of the DES environment, being different than the second symbol, which identifies the second input port as the port domain type of the non-DES environment, and
the second input port enabling the multidomain resource in the DES environment to graphically connect the non-DES environment to the DES environment and to operate in conjunction with a data type associated with the non-DES environment; and
a processor to execute the executable model to analyze a dynamic system, where the processor, when executing the executable model, is to:
provide a non-DES entity in the non-DES environment;
convert the non-DES entity into a format compatible with the DES environment;
receive a DES entity at the first input port of the multidomain resource, wherein the DES entity is an event based entity;
receive the non-DES entity at the second input port of the multidomain resource; and
manipulate the non-DES entity and the DES entity with the multidomain resource.

24. The device of claim 23, wherein the graphical representation of the executable model comprises a DES block diagram.

25. The device of claim 23, wherein the multidomain resource comprises a queue block or a server block.

26. The device of claim 23, wherein the non-DES environment comprises one of:
a continuous time-based model execution environment,
a discrete time-based model execution environment,
a dataflow environment, or
a state-based model execution environment.

27. The device of claim 23, wherein the multidomain resource is configured within a hierarchically configured model.

28. The device of claim 23, wherein the multidomain resource is configured within a subsystem of the executable model.

29. The device of claim 23, wherein the port domain type of the DES environment or the non-DES environment comprises at least one of:
an input trigger-callable port,
an input function-callable port, or
an input enabled port.

30. The device of claim 29, wherein the port domain type of the DES environment or the non-DES environment is identifiable by the first symbol or the second symbol.

31. The device of claim 23, wherein the port domain type of the non-DES environment corresponds to at least one of
a continuous time-based model execution environment,
a discrete time-based model execution environment,
a kinematic constraint-based model execution environment,
a dataflow environment, or
a state-based model execution environment.

32. A non-transitory computer-readable medium storing instructions for modeling a dynamic system, the instructions comprising:
one or more instructions which, when executed by a processor, cause the processor to:
provide a non discrete event system (non-DES) environment associated with a non-DES entity in the dynamic system;
provide an executable model having a multidomain resource present in a discrete event system (DES) environment in the dynamic system, wherein the DES environment schedules when events occur, the multidomain resource comprising:
a first output port indicated by a first symbol, in a graphical representation of the executable model, representing a port domain type of the DES environment,
the first output port connected to a first part of the executable model, the first part of the executable model being separate from the multidomain resource, and
a second output port indicated by a second symbol, in the graphical representation of the executable model, representing a port domain type of the non-DES environment,
the second output port connected to a second part of the executable model, the second part of the executable model being separate from the multidomain resource, and
the first symbol, which identifies the first output port as the port domain type of the DES environment, being different than the second symbol, which identifies the second output port as the port domain type of the non-DES environment, and
the second output port enabling the multidomain resource in the DES environment to graphically connect the non-DES environment to the DES environment and to operate in conjunction with a data type associated with the non-DES environment;

execute the executable model to analyze the dynamic system, where the instructions, when executing the executable model, cause the processor to:
convert the non-DES entity into a format compatible with the DES environment;
manipulate the non-DES entity and a DES entity with the multidomain resource; and
output the DES entity at the first output port of the multidomain resource and the non-DES entity at the second output port of the multidomain resource.

33. The non-transitory computer-readable medium of claim 32, wherein the port domain type of the DES environment or the non-DES environment comprises at least one of an output trigger port and an output function call port.

34. The non-transitory computer-readable medium of claim 32, wherein the port domain type of the non-DES environment corresponds to at least one of
a continuous time-based model execution environment,
a discrete time-based model execution environment,
a kinematic constraint-based model execution environment,
a dataflow environment, or
a state-based model execution environment.

* * * * *

UNITED STATES PATENT AND TRADEMARK OFFICE
CERTIFICATE OF CORRECTION

PATENT NO. : 10,824,400 B2
APPLICATION NO. : 14/084226
DATED : November 3, 2020
INVENTOR(S) : Andrew C. Grace et al.

It is certified that error appears in the above-identified patent and that said Letters Patent is hereby corrected as shown below:

In the Specification

Column 3, Line 46:
"signal to Gain block 106 through 116. Gain block 106"
Should read:
--signal to Gain block 106. Gain block 106--

Column 11, Lines 10-24 delete:
"FIG. 5 depicts a sample DES model environment 200.
The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, Simulink® can be used as a source for the present DES modeler, wherein a Simulink signal can trigger the generation of an entity for use in the DES model based upon criteria set by a DES modeler user."

Column 11, Lines 25-46 delete:
"Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can Signed and Sealed this
Eleventh Day of May, 2021

Drew Hirshfeld
*Performing the Functions and Duties of the
Under Secretary of Commerce for Intellectual Property and
Director of the United States Patent and Trademark Office* also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block that allows the export of a signal from the DES model to an external environment. For example the DES modeler of the present invention can include a block that receives an entity and outputs a Simulink® signal that may be used in a Simulink® environment."